(12) United States Patent
Chen

(10) Patent No.: US 12,400,664 B2
(45) Date of Patent: Aug. 26, 2025

(54) VOICE-CONTROLLED SPLIT-SCREEN DISPLAY METHOD AND ELECTRONIC DEVICE

(71) Applicant: Huawei Technologies Co., Ltd., Shenzhen (CN)

(72) Inventor: Xiang Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 549 days.

(21) Appl. No.: 17/639,004

(22) PCT Filed: Aug. 4, 2020

(86) PCT No.: PCT/CN2020/106894
§ 371 (c)(1),
(2) Date: Feb. 28, 2022

(87) PCT Pub. No.: WO2021/036714
PCT Pub. Date: Mar. 4, 2021

(65) Prior Publication Data
US 2022/0343919 A1    Oct. 27, 2022

(30) Foreign Application Priority Data
Aug. 26, 2019   (CN) .......................... 201910792694.X

(51) Int. Cl.
*G10L 17/22* (2013.01)
*G06F 3/0484* (2022.01)
(Continued)

(52) U.S. Cl.
CPC ............ *G10L 17/22* (2013.01); *G06F 3/0484* (2013.01); *G06F 3/04842* (2013.01);
(Continued)

(58) Field of Classification Search
CPC ......... G10L 17/22; G10L 15/22; G10L 17/04; G10L 17/06; G10L 17/14;
(Continued)

(56) References Cited

U.S. PATENT DOCUMENTS 10,310,797 B1 *   6/2019   Rayner ................. H04L 67/535
10,514,949 B1 *  12/2019   Korda .................... G06F 9/5072
(Continued)

FOREIGN PATENT DOCUMENTS

CN         103279303 A        9/2013
CN         103748585 A        4/2014
(Continued)

*Primary Examiner* — Edwin S Leland, III
(74) *Attorney, Agent, or Firm* — Conley Rose, P.C.

(57) ABSTRACT

An electronic device displays, on a display in response to a first operation of a first user, an interface corresponding to a first task, where the display currently does not display an interface corresponding to another task; the electronic device collects first voice data when displaying the interface corresponding to the first task; the electronic device recognizes the first voice data in response to the first voice data including a wake-up word of the electronic device, where the first voice data is used to trigger the electronic device to execute a second task; and the electronic device displays, in a first display area of the display, the interface corresponding to the first task, and displays, in a second display area of the display, an interface corresponding to the second task, based on the first voice data being recognized as voice data of a second user.

20 Claims, 23 Drawing Sheets

(51) Int. Cl.
*G06F 3/04842* (2022.01)
*G06F 3/04847* (2022.01)
*G06F 3/147* (2006.01)
*G06F 3/16* (2006.01)
*G06V 40/16* (2022.01)
*G09G 5/14* (2006.01)
*G10L 15/22* (2006.01)
*G10L 17/04* (2013.01)
*G10L 17/06* (2013.01)
*G10L 17/14* (2013.01)
*H04N 21/442* (2011.01)
*H04N 21/443* (2011.01)

(52) U.S. Cl.
CPC .......... *G06F 3/04847* (2013.01); *G06F 3/147* (2013.01); *G06F 3/167* (2013.01); *G06V 40/166* (2022.01); *G09G 5/14* (2013.01); *G10L 15/22* (2013.01); *G10L 17/04* (2013.01); *G10L 17/06* (2013.01); *G10L 17/14* (2013.01); *H04N 21/44218* (2013.01); *H04N 21/4438* (2013.01); *G06F 2203/04803* (2013.01); *G09G 2354/00* (2013.01); *G10L 2015/223* (2013.01)

(58) Field of Classification Search
CPC ............. G10L 2015/223; G06F 3/0484; G06F 3/04842; G06F 3/04847; G06F 3/147; G06F 3/167; G06F 2203/04803; G06V 40/166; G09G 5/14; G09G 2354/00; H04N 21/44218; H04N 21/4438
USPC ........................................................ 704/243
See application file for complete search history.

(56) References Cited

U.S. PATENT DOCUMENTS

| | | | |
|---|---|---|---|
| 2014/0049693 A1 | 2/2014 | Selim et al. | |
| 2014/0125575 A1* | 5/2014 | Samanta Singhar | G06F 3/038 345/156 |
| 2015/0355831 A1* | 12/2015 | Amendolagine | H04L 65/403 715/751 |
| 2016/0092064 A1 | 3/2016 | Wu | |
| 2016/0351168 A1 | 12/2016 | Yan et al. | |
| 2017/0034469 A1 | 2/2017 | Lin | |
| 2017/0083203 A1* | 3/2017 | Van Der Zaag | G06F 3/0488 |
| 2017/0105146 A1* | 4/2017 | Zeng | H04W 36/08 |
| 2017/0186400 A1 | 6/2017 | Song et al. | |
| 2018/0052595 A1 | 2/2018 | Parmar et al. | |
| 2018/0285065 A1 | 10/2018 | Jeong | |
| 2019/0228140 A1* | 7/2019 | Arroyo | G06V 40/1365 |
| 2019/0317606 A1* | 10/2019 | Jain | G06F 3/167 |
| 2019/0392121 A1* | 12/2019 | VanBlon | G06F 3/01 |
| 2022/0343919 A1* | 10/2022 | Chen | G06F 3/04842 |

FOREIGN PATENT DOCUMENTS

| | | | | |
|---|---|---|---|---|
| CN | 104123056 A | | 10/2014 | |
| CN | 104244105 A | | 12/2014 | |
| CN | 104850373 A | | 8/2015 | |
| CN | 105744368 A | | 7/2016 | |
| CN | 105812887 A | | 7/2016 | |
| CN | 107479815 A | * | 12/2017 | ............. G06F 3/017 |
| CN | 108549519 A | * | 9/2018 | ........... G06F 3/0484 |
| CN | 108668153 A | | 10/2018 | |
| CN | 108717342 A | * | 10/2018 | ........... G06F 3/0481 |
| CN | 108897508 A | | 11/2018 | |
| CN | 108958633 A | | 12/2018 | |
| CN | 108958810 A | * | 12/2018 | ............. G06F 21/32 |
| CN | 108962260 A | * | 12/2018 | |
| CN | 109032554 A | | 12/2018 | |
| CN | 105404484 B | | 1/2019 | |
| CN | 109976645 A | | 7/2019 | |
| CN | 110060679 A | | 7/2019 | |
| CN | 110704004 A | | 1/2020 | |
| EP | 4284002 A1 | * | 11/2023 | ........... G06F 3/1446 |
| KR | 20110110543 A | * | 10/2011 | |

* cited by examiner

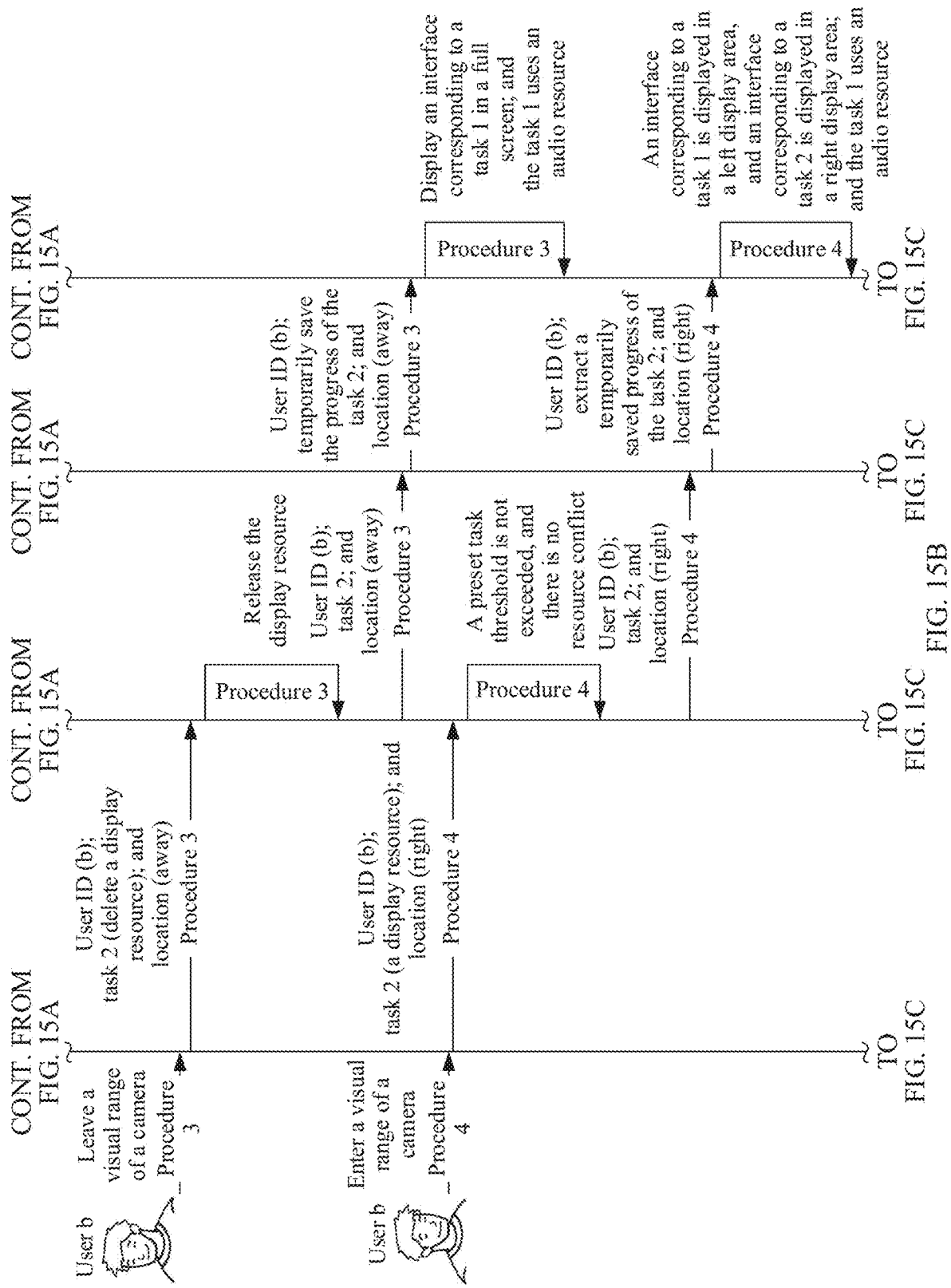

VOICE-CONTROLLED SPLIT-SCREEN DISPLAY METHOD AND ELECTRONIC DEVICE

CROSS-REFERENCE TO RELATED APPLICATIONS

This application is a national stage of International Application No. PCT/CN2020/106894 filed on Aug. 4, 2020, which claims priority to Chinese Patent Application No. 201910792694.X filed on Aug. 26, 2019. Both of the aforementioned applications are hereby incorporated by reference in their entireties.

TECHNICAL FIELD

Embodiments of this application relate to the field of intelligent voice control and split-screen display technologies, and in particular, to a voice-controlled split-screen display method and an electronic device.

BACKGROUND

With development of electronic technologies, intelligent terminals have an increasingly large quantity of functions. For example, the intelligent terminal may have a voice control function. To be specific, the intelligent terminal may receive voice information (for example, "play Peppa Pig") input by a user, perform semantic understanding on the voice information, and then execute an event (play the cartoon "Peppa Pig") corresponding to a semantic understanding result. For example, the intelligent terminal having the voice control function may be a mobile terminal such as a mobile phone, a tablet computer, or a wearable device, or may be a large-screen terminal such as a television.

With development of screen technologies, a display of the intelligent terminal is increasingly large, to provide richer information for the user, and bring better use experience for the user. However, when an electronic device with a relatively large display (for example, a large-screen television) displays a corresponding application interface in response to a voice command of the user, display content of the electronic device may be relatively simple, and the display of the electronic device may not be fully utilized.

SUMMARY

Embodiments of this application provide a voice-controlled split-screen display method, to enrich display content of an electronic device, and improve utilization of a display of the electronic device.

According to a first aspect, an embodiment of this application provides a voice-controlled split-screen display method. The method may be applied to an electronic device including a display and a microphone. The method may include: The electronic device displays, on the display in response to a first operation of a first user, an interface corresponding to a first task, where the display currently does not display an interface corresponding to another task; the electronic device collects first voice data when displaying the interface corresponding to the first task; the electronic device recognizes the first voice data in response to the fact that the first voice data includes a wake-up word of the electronic device, where the first voice data is used to trigger the electronic device to execute a second task; and the electronic device displays, in a first display area of the display, the interface corresponding to the first task, and displays, in a second display area of the display, an interface corresponding to the second task, based on the fact that the first voice data is recognized as voice data of a second user.

In this embodiment of this application, when the electronic device displays an interface corresponding to a task in response to an operation of a user, the electronic device may further display interfaces corresponding to two tasks in a split-screen manner on the display in response to a voice command (namely, voice data) of another user. In other words, the electronic device may display interfaces corresponding to a plurality of tasks in a split-screen manner on the display in response to operations (for example, voice commands) of a plurality of users. This can enrich display content of the electronic device and improve utilization of the display of the electronic device.

With reference to the first aspect, in a possible design, the first display area is close to a first side of the display, the second display area is close to a second side of the display, and the first side and the second side are left and right opposite sides of the display. The electronic device further includes a camera, or the electronic device is externally connected to a camera.

The electronic device may further record a location of the first user relative to the display and a location of the second user relative to the display. For example, before the electronic device displays, in the first display area of the display, the interface corresponding to the first task, and displays, in the second display area of the display, the interface corresponding to the second task, the electronic device may determine, by using the camera and/or the microphone, that the first user is close to the first side of the display and the second user is close to the second side of the display. In this way, when the electronic device displays the interface corresponding to the first task and the interface corresponding to the second task in a split-screen manner on the display, the electronic device may display, in a display area close to the first user, the interface corresponding to the first task, and display, in a display area close to the second user, the interface corresponding to the second task, based on the locations of the first user and the second user relative to the display.

With reference to the first aspect, in another possible design, in a process in which the electronic device displays the interface corresponding to the first task or the interface corresponding to the second task in a split-screen manner on the display, the locations of the first user and the second user relative to the display may change. For example, the first user may move from the first side (for example, a right side) of the display to the second side (for example, a left side) of the display, and the second user may move from the second side of the display to the first side of the display.

Based on this case, after the electronic device displays, in the first display area, the interface corresponding to the first task, and displays, in the second display area, the interface corresponding to the second task, the method in this embodiment of this application may further include: The electronic device determines, by using the camera and/or the microphone, that the first user is close to the second side of the display and the second user is close to the first side of the display; and the electronic device displays, in the second display area, the interface corresponding to the first task, and displays, in the first display area, the interface corresponding to the second task.

In this embodiment of this application, the electronic device may monitor location movement of the user in real time. When the electronic device displays the interface corresponding to the first task and the interface corresponding to the second task in a split-screen manner on the display, the electronic device may display, in the display area close to the first user, the interface corresponding to the first task, and display, in the display area close to the second user, the interface corresponding to the second task, based on the real-time locations of the first user and the second user relative to the display. This can help the user view an interface corresponding to a task triggered by the user, and help improve viewing experience of the user.

With reference to the first aspect, in another possible design, there may be a resource conflict between the execution of the second task by the electronic device and the execution of the first task by the electronic device. For example, if both the first task and the second task are audio and video tasks that need to use a sound box or a speaker of the electronic device, such as "play music", "play a cartoon", or "play a talk show", there is a resource conflict between the execution of the second task by the electronic device and the execution of the first task by the electronic device. The resource conflict may include an audio conflict.

To avoid the foregoing resource conflict, only w % ben determining that there is no resource conflict between the execution of the second task by the electronic device and the execution of the first task by the electronic device, the electronic device displays the interface corresponding to the first task and the interface corresponding to the second task in a split-screen manner on the display. Specifically, that the electronic device displays, in a first display area of the display, the interface corresponding to the first task, and displays, in a second display area of the display, an interface corresponding to the second task, based on the fact that the first voice data is recognized as voice data of a second user includes: The electronic device determines, based on the fact that the first voice data is recognized as the voice data of the second user, that there is no resource conflict between the execution of the second task by the electronic device and the execution of the first task by the electronic device, displays, in the first display area, the interface corresponding to the first task, and displays, in the second display area, the interface corresponding to the second task.

In this embodiment of this application, only when there is no resource conflict between the execution of the second task by the electronic device and the execution of the first task by the electronic device, the electronic device may display the interface corresponding to the first task or the interface corresponding to the second task in a split-screen manner on the display. This can ensure program playback quality of the first task or the second task executed by the electronic device, and reduce impact on viewing experience of the user.

With reference to the first aspect, in another possible design, the electronic device determines, based on the fact that the first voice data is recognized as the voice data of the second user, that there is a resource conflict between the execution of the second task by the electronic device and the execution of the first task by the electronic device; and the electronic device may display a first interface. The user selects, in the first interface, to display the interface corresponding to the first task or the interface corresponding to the second task. In response to a second operation performed by the user on the first interface, the electronic device displays the interface corresponding to the first task, but does not display the interface corresponding to the second task, on the display. Alternatively, in response to a third operation performed by the user on the first interface, the electronic device displays the interface corresponding to the second task, but does not display the interface corresponding to the first task, on the display.

With reference to the first aspect, in another possible design, in a process in which the electronic device displays the interface corresponding to the first task and the interface corresponding to the second task in a split-screen manner, one user (for example, the first user or the second user) may leave and no longer watch the electronic device. In this case, to improve viewing experience of the other user, the electronic device may no longer display an interface corresponding to a task triggered by the user who leaves.

Specifically, the electronic device may further include the camera, or the electronic device is externally connected to the camera. The electronic device may collect a face image of the first user and a face image of the second user by using the camera. If the electronic device detects the face image of the second user within a first preset time period, but does not detect the face image of the first user, the electronic device may display the interface corresponding to the second task, but not display the interface corresponding to the first task, on the display. If the electronic device does not display, on the display, the interface corresponding to the first task, it indicates that the electronic device currently does not execute the first task or suspends the execution of the first task.

In this embodiment of this application, when detecting that the user has left and no longer watches the electronic device, the electronic device may stop displaying the interface corresponding to the task triggered by the user, and display, on the entire display, an interface corresponding to a task triggered by a user who still watches the electronic device. In this way, the electronic device may display, in a large display area, the interface corresponding to the task triggered by the user who still watches the electronic device. This can improve viewing experience of the user who still watches the electronic device.

It may be understood, after the electronic device does not display the interface corresponding to the first task, if the electronic device re-detects the face image of the first user and the face image of the second user within a second preset time period after the first preset time period, it indicates that the first user returns to continue to watch the electronic device. In this case, the electronic device may display, in the first display area, the interface corresponding to the first task, and display, in the second display area, the interface corresponding to the second task. Alternatively, the electronic device may display, in the second display area, the interface corresponding to the first task, and display, in the first display area, the interface corresponding to the second task. Specifically, the electronic device may display, in the display area close to the first user, the interface corresponding to the first task, and display, in the display area close to the second user, the interface corresponding to the second task, based on the locations of the first user and the second user relative to the display.

In this embodiment of this application, when detecting that a user leaves and no longer watches the electronic device, the electronic device may stop displaying, on the display, an interface corresponding to a task triggered by the user. When detecting that the user returns to continue to watch the electronic device within the second preset time period, the electronic device may re-display, on a display area of the display, the interface corresponding to the first task. That is, if the user returns to continue to watch the electronic device within the second preset time period, the electronic device may automatically resume displaying the interface corresponding to the task triggered by the user.

This can make the electronic device more intelligent, improve interaction performance between the electronic device and the user, and further improve user experience of using the electronic device.

With reference to the first aspect, in another possible design, after the electronic device does not display the interface corresponding to the first task, if the electronic device does not detect the face image of the first user within the second preset time period, but re-detects the face image of the first user after the second preset time period, the electronic device displays the interface corresponding to the second task, but does not display the interface corresponding to the first task, on the display.

With reference to the first aspect, in another possible design, if a total quantity of tasks currently executed by the electronic device is less than a preset task threshold, the electronic device may display, in the first display area, the interface corresponding to the first task, and display, in the second display area, the interface corresponding to the second task, based on the fact that the first voice data is recognized as the voice data of the second user. The preset task threshold is the same as a quantity of display areas in a plurality of display areas. If the total quantity of tasks currently executed by the electronic device is equal to the preset task threshold, the electronic device may display the interface corresponding to the first task, but does not display another interface, on the display.

With reference to the first aspect, in another possible design, the electronic device may determine, based on a user level of the user, an interface corresponding to a task triggered by a user to be displayed. The method in this embodiment of this application may further include: In response to the first voice data, if the total quantity of tasks currently executed by the electronic device is equal to the preset task threshold, the electronic device determines whether a user level of the second user is higher than a user level of the first user. If the user level of the second user is higher than the user level of the first user, the electronic device displays, on the display, the interface corresponding to the second task, and the display does not display another interface. If the user level of the second user is lower than the user level of the first user, the electronic device displays, on the display, the interface corresponding to the first task, and the display does not display another interface.

With reference to the first aspect, in another possible design, in a process in which the electronic device displays the interface corresponding to the first task and the interface corresponding to the second task in a split-screen manner, the electronic device may further receive voice data (for example, second voice data) sent by the first user, the second user, or another user (for example, a third user). The second voice data is further used to trigger the electronic device to execute a third task. Specifically, the method in this embodiment of this application may further include: The electronic device collects the second voice data; in response to the fact that the second voice data includes the wake-up word, the electronic device determines whether the second voice data is voice data of the first user, the second user, or the third user; and the electronic device displays, in the first display area, an interface corresponding to the third task, and displays, in the second display area, the interface corresponding to the second task, based on the fact that the second voice data is recognized as the voice data of the first user.

With reference to the first aspect, in another possible design, the third task is different from the first task, or the third task is a subtask of the first task.

With reference to the first aspect, in another possible design, the third task is different from the first task. Before the electronic device displays, in the first display area, the interface corresponding to the third task, and displays, in the second display area, the interface corresponding to the second task, the electronic device may first determine that there is no resource conflict between the execution of the third task by the electronic device and the execution of the second task by the electronic device.

With reference to the first aspect, in another possible design, the electronic device may display, in the second display area, the interface corresponding to the third task, and display, in the first display area, the interface corresponding to the first task, based on the fact that the second voice data is recognized as the voice data of the second user.

With reference to the first aspect, in another possible design, the electronic device stores user identifiers of a plurality of users and a user level of each of the plurality of users. It is assumed that the user level of the second user is higher than the user level of the first user. The method in this embodiment of this application may further include: The electronic device determines, based on the fact that the second voice data is recognized as the voice data of the third user, whether a user level of the third user is higher than the user level of the first user; if the user level of the third user is higher than the user level of the first user, the electronic device determines whether there is a resource conflict between the execution of the third task by the electronic device and the execution of the second task by the electronic device; and if there is no resource conflict between the execution of the third task by the electronic device and the execution of the second task by the electronic device, the electronic device displays, in the first display area, the interface corresponding to the third task, and displays, in the second display area, the interface corresponding to the second task. In other words, the electronic device may preferentially execute a task triggered by a user with a higher user level. This can improve use experience of the user with a higher user level.

With reference to the first aspect, in another possible design, if the user level of the third user is lower than the user level of the first user, the electronic device displays, in the first display area, the interface corresponding to the first task, and displays, in the second display area, the interface corresponding to the second task.

With reference to the first aspect, in another possible design, the user level of the third user may be equal to the user level of the first user. In this case, the electronic device may display, in the first display area, the interface corresponding to the first task, and display, in the second display area, the interface corresponding to the second task. Alternatively, the electronic device may display, in the first display area, the interface corresponding to the third task, and display, in the second display area, the interface corresponding to the second task. Alternatively, the electronic device may display a second interface; and in response to a fourth operation performed by the user on the second interface, the electronic device displays, in the first display area, the interface corresponding to the first task, and displays, in the second display area, the interface corresponding to the second task; or in response to a fifth operation performed by the user on the second interface, the electronic device displays, in the first display area, the interface corresponding to the third task, and displays, in the second display area, the interface corresponding to the second task.

In this embodiment of this application, in a process in which the electronic device displays the interface corresponding to the first task and the interface corresponding to the second task in a split-screen manner, the electronic device may further receive the second voice data (namely, the voice command) that is used to trigger the electronic device to execute a new task (namely, the third task) and display the interface corresponding to the third task. In this case, the electronic device may recognize the user who sends the second voice data, determine whether there is a resource conflict between the execution of the third task by the electronic device and the execution of the first task or the second task by the electronic device, and compare the user levels of all the users with each other, to display interfaces of the plurality of tasks in a split-screen manner. According to the method in this embodiment of this application, display content of the electronic device can be enriched, and utilization of the display of the electronic device can be improved. In addition, program playback quality of the plurality of tasks executed by the electronic device can be ensured, and user experience can be improved.

According to a second aspect, an embodiment of this application provides an electronic device. The electronic device includes a memory, a display, a microphone, and one or more processors. The memory, the display, and the microphone each are coupled to the processor. The memory is configured to store computer program code. The computer program code includes computer instructions. When the computer instructions are executed by the one or more processors, the electronic device is enabled to perform the method according to any one of the first aspect and the possible designs of the first aspect.

According to a third aspect, an embodiment of this application provides a chip system. The chip system is applied to the foregoing electronic device including the display and the microphone. The chip system includes one or more interface circuits and one or more processors. The interface circuit and the processor are interconnected by using a line. The interface circuit is configured to receive a signal from a memory of the electronic device, and send the signal to the processor, where the signal includes computer instructions stored in the memory. When the processor executes the computer instructions, the electronic device performs the method according to any one of the first aspect and the possible designs of the first aspect.

According to a fourth aspect, an embodiment of this application provides a computer storage medium. The computer storage medium includes computer instructions, and when the computer instructions are run on an electronic device, the electronic device is enabled to perform the method according to any one of the first aspect and the possible designs of the first aspect.

According to a fifth aspect, an embodiment of this application provides a computer program product. When the computer program product is run on a computer, the computer is enabled to perform the method according to any one of the first aspect and the possible designs of the first aspect.

It may be understood, for beneficial effects achievable by the electronic device according to any one of the second aspect and the possible designs of the second aspect, the chip system according to the third aspect, the computer storage medium according to the fourth aspect, and the computer program product according to the fifth aspect, refer to the beneficial effects according to any one of the first aspect and the possible designs of the first aspect. Details are not described herein again.

BRIEF DESCRIPTION OF DRAWINGS

FIG. 15B, and FIG. 15C are a flowchart of a principle of a voice-controlled split-screen display method according to an embodiment of this application.

DESCRIPTION OF EMBODIMENTS

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments, unless otherwise specified, "a plurality of" means two or more than two.

The embodiments of this application provide a voice-controlled split-screen display method. The method may be applied to an electronic device including a display and a microphone. In the method, the electronic device may display interfaces of a plurality of applications on the display in response to a voice command (namely, voice data) of a user. This can enrich display content of the electronic device and improve utilization of the display of the electronic device.

For example, the electronic device in the embodiments of this application may be a device including a display and a microphone, for example, a television, a tablet computer, a projector, a mobile phone, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR)/virtual reality (virtual reality. VR) device, or an in-vehicle device. A specific form of the electronic device is not particularly limited in the embodiments of this application.

Figure 1:
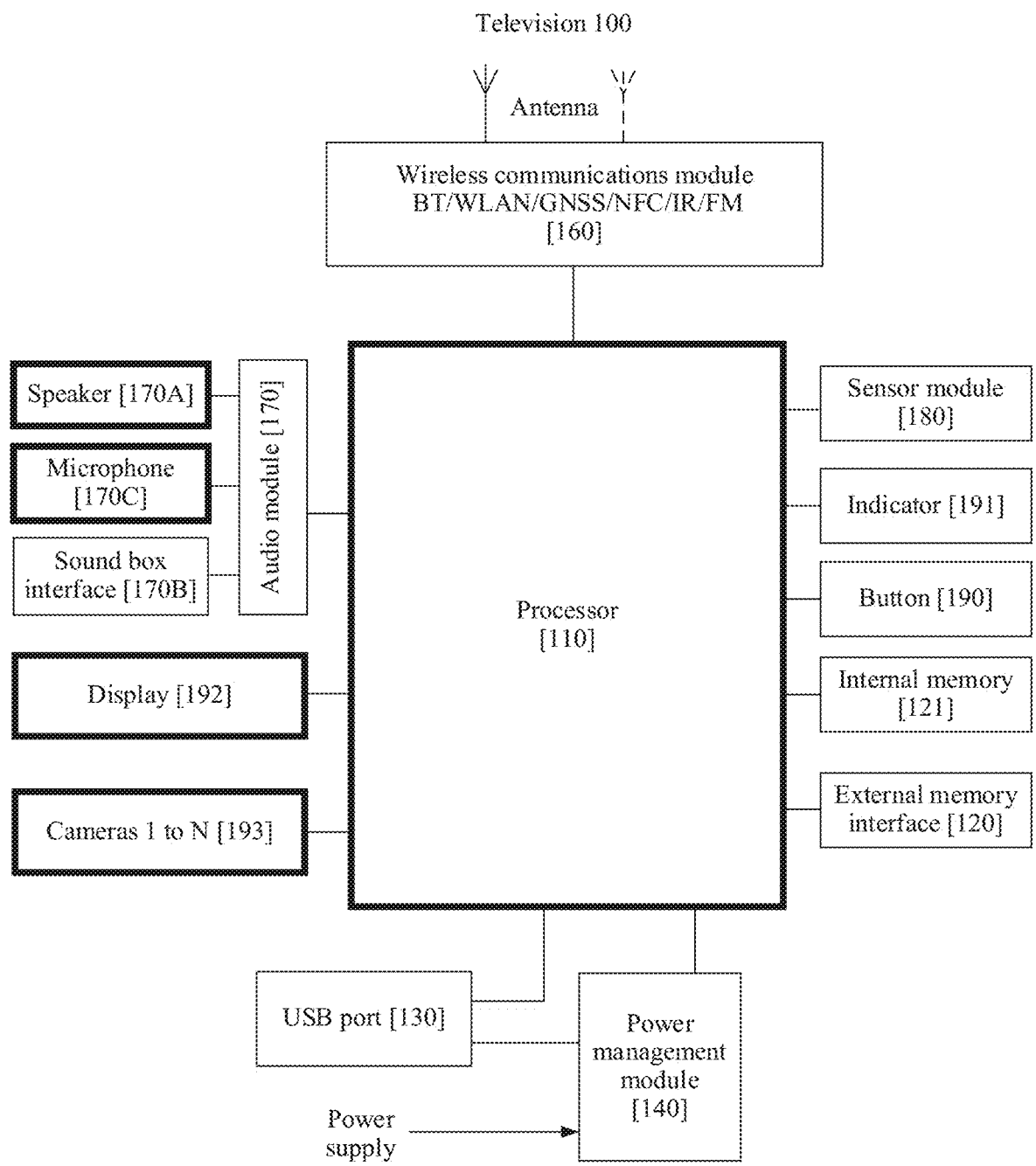
FIG. 1 is a schematic diagram of a hardware structure of a television according to an embodiment of this application.

The following describes a structure of the electronic device by using an example in which the electronic device is a television. FIG. 1 is a schematic diagram of a structure of a television 100 according to an embodiment of this application. As shown in FIG. 1, the television 100 may include a processor 110, an external memory interface 120, an internal memory 121, a universal serial bus (universal serial bus, USB) port 130, a power management module 140, an antenna, a wireless communications module 160, an audio module 170, a speaker 170A, a microphone 170C, a sound box interface 170B, a sensor module 180, a button 190, an indicator 191, a camera 193, a display 192, and the like.

The sensor module 180 may include a distance sensor 180F, an optical proximity sensor 180G, a fingerprint sensor 180H, a temperature sensor 180J, a touch sensor 180K, an ambient light sensor 180L, and the like.

It may be understood that an example structure in this embodiment does not constitute a specific limitation on the television 100. In some other embodiments, the television 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural network processing unit (neural network processing unit, NPU). Different processing units may be standalone devices, or may be integrated into one or more processors.

The controller may be a nerve center and a command center of the television 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a USB port, and/or the like.

It may be understood that an interface connection relationship between modules illustrated in this embodiment is merely an example for description, and does not constitute a limitation on the structure of the television 100. In some other embodiments, the television 100 may alternatively use an interface connection manner different from an interface connection manner in the foregoing embodiment, or use a combination of a plurality of interface connection manners.

The power management module 140 is configured to connect to a power supply. The power management module 140 may be further connected to the processor 110, the internal memory 121, the display 192, the camera 193, the wireless communications module 160, and the like. The power management module 140 receives input of the power supply and supplies power to the processor 110, the internal memory 121, the display 192, the camera 193, the wireless communications module 160, and the like. In some embodiments, the power management module 140 may alternatively be disposed in the processor 110.

A wireless communication function of the television 100 may be implemented by using the antenna, the wireless communications module 160, or the like. The wireless communications module 160 may provide a wireless communication solution that includes a wireless local area network (wireless local area network, WLAN) (for example, a wireless fidelity (wireless fidelity, Wi-Fi) network), Bluetooth (Bluetooth. BT), a global navigation satellite system (global navigation satellite system, GNSS), frequency modulation (frequency modulation, FM), a near field communication (near field communication. NFC) technology, an infrared (infrared, IR) technology, or the like and that is applied to the television 100.

The wireless communications module 160 may be one or more components integrating at least one communications processing module. The wireless communications module 160 receives an electromagnetic wave through the antenna, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna. In some embodiments, the antenna and the wireless communications module 160 in the television 100 are coupled, so that the television 100 can communicate with a network and another device by using a wireless communications technology.

The television 100 implements a display function through the GPU, the display 192, the application processor, and the like. The GPU is a microprocessor for image processing, and is connected to the display 192 and the application processor. The GPU is configured to: perform mathematical and geometric calculation, and render an image. The processor

110 may include one or more GPUs that execute program instructions to generate or change display information.

The display 192 is configured to display an image, a video, and the like. The display 192 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), mini LED, a micro LED, a micro OLED, a quantum dot light-emitting diode (quantum dot light-emitting diode, QLED), or the like.

The television 100 may implement a photographing function through the ISP, the camera 193, the video codec, the GPU, the display 192, the application processor, and the like. The ISP is configured to process data fed back by the camera 193. In some embodiments, the ISP may be disposed in the camera 193.

Figure 3:
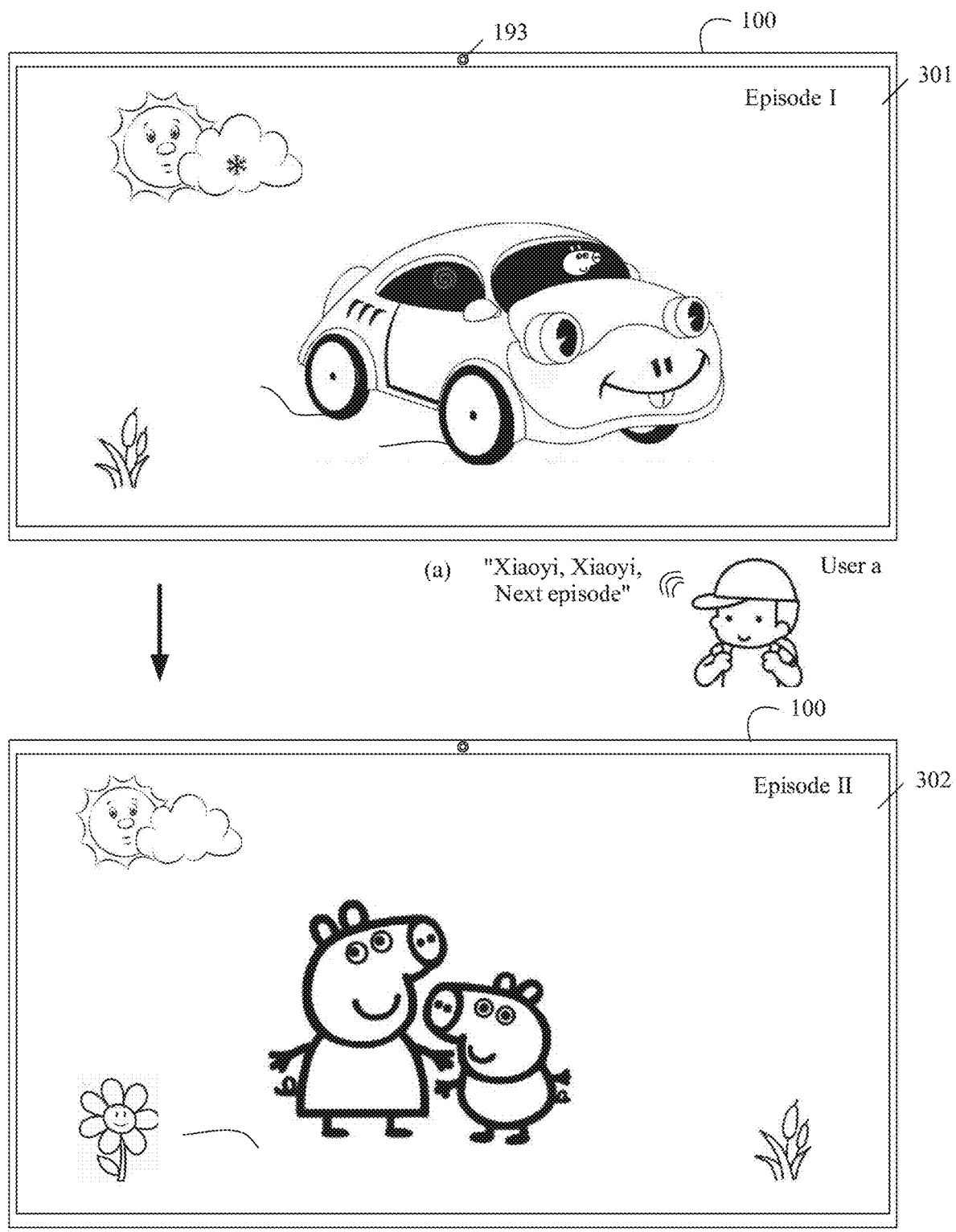
FIG. 3 is a schematic diagram of an example of a display interface of a television according to an embodiment of this application.

The camera 193 is configured to capture a static image or a video. An optical image of an object is generated through the lens, and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the television 100 may include one or N cameras 193, where N is a positive integer greater than 1. For example, as shown in FIG. 3(*a*), the camera 193 may be disposed at an upper edge of the display 192 of the television 100. Certainly, a location of the camera 193 on the television 100 is not limited in this embodiment of this application.

Alternatively, the television 100 may not include the camera, that is, the camera 193 is not disposed in the television 100. The television 100 may be externally connected to a camera 193 through an interface (for example, the USB port 130). The camera 193 may be fastened to the television 100 by using an external fastener (for example, a camera support with a clip). For example, the camera 193 may be fastened to an edge such as an upper edge of the display 192 of the television 100 by using the external fastener.

The digital signal processor is configured to process a digital signal, and may process another digital signal in addition to the digital image signal. For example, when the television 100 selects a frequency, the digital signal processor is configured to perform Fourier transform and the like on frequency energy. The video codec is configured to compress or decompress a digital video. The television 100 may support one or more video codecs. Therefore, the television 100 can play or record videos of a plurality of coding formats, for example, moving picture experts group (moving picture experts group, MPEG)-1, MPEG-2, MPEG-3, and MPEG-4.

The NPU is a neural network (neural network, NN) computing processor. The NPU quickly processes input information with reference to a structure of a biological neural network, for example, with reference to a transfer mode between human brain neurons, and may further continuously perform self-learning. Applications such as intelligent cognition of the television 100, for example, image recognition, facial recognition, speech recognition, and text understanding, can be implemented through the NPU.

The external memory interface 120 may be configured to be connected to an external memory card such as a micro SD card, to extend a storage capability of the television 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 runs the instructions stored in the internal memory 121 to perform various function applications of the television 100 and data processing. For example, in this embodiment of this application, the processor 110 may execute the instructions stored in the internal memory 121, and the internal memory 121 may include a program storage area and a data storage area.

The program storage area may store an operating system, an application required by at least one function (for example, a voice playing function or an image playing function), and the like. The data storage area may store data (such as audio data and a phone book) created during use of the television 100, and the like. In addition, the internal memory 121 may include a high-speed random access memory, and may further include a nonvolatile memory, for example, at least one magnetic disk storage device, a flash memory device, or a universal flash storage (universal flash storage, UFS).

The television 100 may implement an audio function such as music playing or recording by using the audio module 170, the speaker 170A, the microphone 170C, the sound box interface 170B, the application processor, and the like.

The audio module 170 is configured to convert digital audio information into analog audio signal output, and is also configured to convert analog audio input into a digital audio signal. The audio module 170 may further be configured to code and decode an audio signal. In some embodiments, the audio module 170 may be disposed in the processor 110, or some function modules of the audio module 170 are disposed in the processor 110. The speaker 170A, also referred to as a "loudspeaker", is configured to convert an audio electrical signal into a sound signal. The microphone 170C, also referred to as a "mike" or a "mic", is configured to convert a sound signal into an electrical signal.

The sound box interface 170B is configured to connect to a wired sound box. The sound box interface 170B may be the USB port 130, or may be a 3.5 mm open mobile terminal platform (open mobile terminal platform, OMTP) standard interface, or a cellular telecommunications industry association of the USA (cellular telecommunications industry association of the USA. CTIA) standard interface.

The button 190 includes a power button, a volume button, and the like. The button 190 may be a mechanical button, or may be a touch button. The television 100 may receive a button input, and generate button signal input related to a user setting and function control of the television 100.

The indicator 191 may be an indicator light, and may be configured to indicate that the television 100 is in a power-on mode, a standby mode, a power-off mode, or the like. For example, if the indicator light is off, it may be indicated that the television 100 is in a power-off mode; if the indicator light is green or blue, it may be indicated that the television 100 is in a power-on mode; and if the indicator light is red, it may be indicated that the television 100 is in a standby mode.

Usually, the television 100 is equipped with a remote control. The remote control is used to control the television 100. The remote control may include a plurality of buttons, such as a power button, a volume button, and a plurality of other selection buttons. The button on the remote control may be a mechanical button, or may be a touch button. The remote control may receive key input, generate key signal input related to a user setting and function control of the television 100, and send a corresponding control signal to the television 100, to control the television 100. For example, the remote control may send a control signal to the television 100 through an infrared signal or the like. The remote control may further include a battery storage cavity that is configured to mount a battery and supply power to the remote control.

It can be understood that the structure shown in this embodiment of this application does not constitute a specific limitation on the television 100. The television may have more or fewer components than those shown in FIG. 1, may combine two or more components, or may have a different component configuration. For example, the television may further include a component such as a sound box. Various components shown in FIG. 1 may be implemented in hardware, software, or a combination of hardware and software that includes one or more signal processing or application-specific integrated circuits.

All methods in the following embodiments may be implemented on the television 100 having the foregoing hardware structure. In the following embodiments, an example in which the electronic device is the television 100 is used to describe the method in the embodiments of this application.

Figure 2:
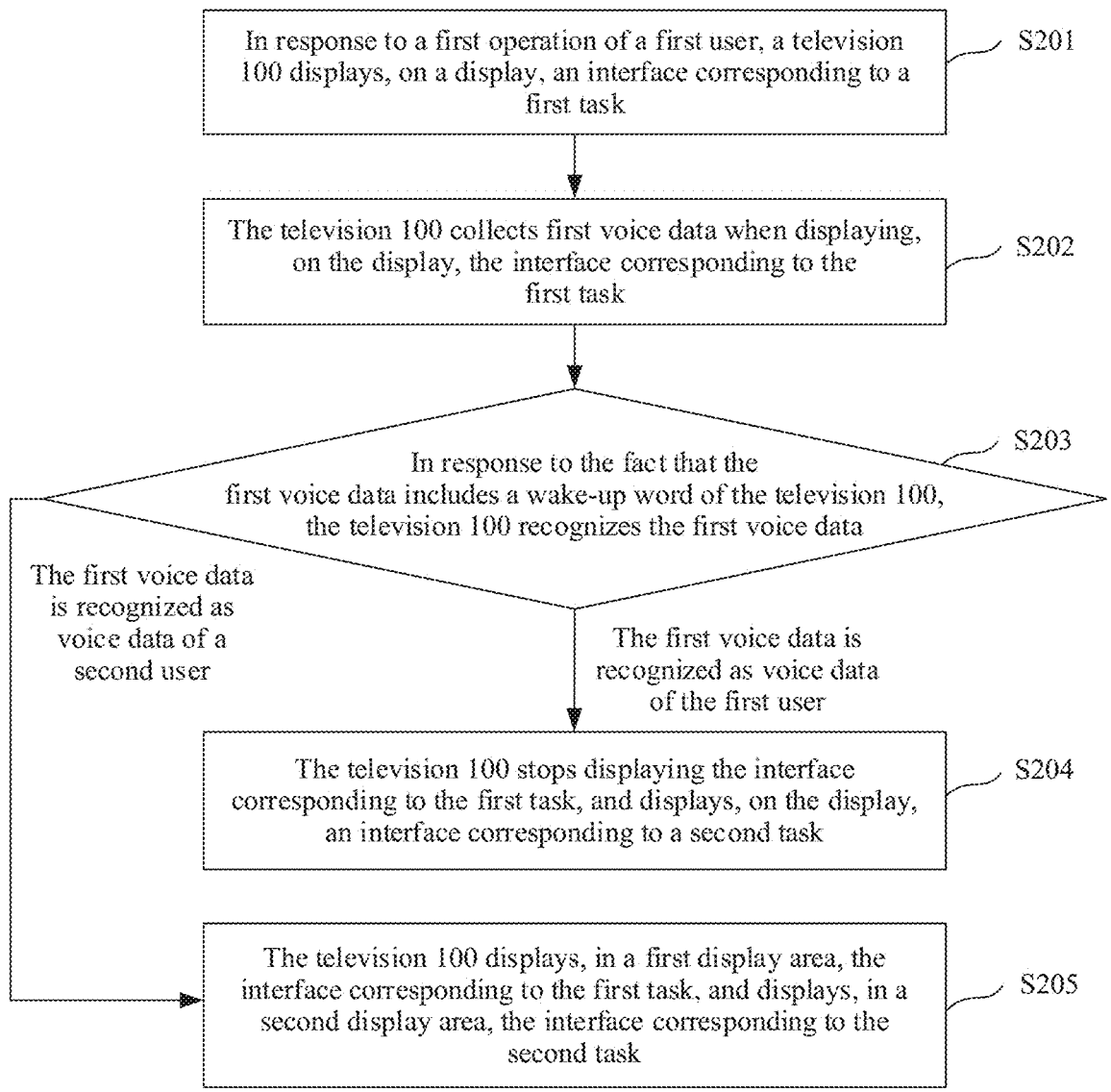
FIG. 2 is a flowchart of a voice-controlled split-screen display method according to an embodiment of this application.

An embodiment of this application provides a voice-controlled split-screen display method. As shown in FIG. 2, the voice-controlled split-screen display method may include S201 to S205.

S201: In response to a first operation of a first user, the television 100 displays, on a display, an interface corresponding to a first task.

It should be noted that, that the television 100 displays, on a display, an interface corresponding to a first task specifically means that the interface corresponding to the first task is displayed in an entire display area of the display. The display of the television 100 currently does not display an interface corresponding to another task. For example, it is assumed that the first task is "play Peppa Pig". As shown in (a) in FIG. 3, the television 100 displays, in the entire display area of the display, an interface 301 corresponding to "Peppa Pig".

In some embodiments, the first operation may be an operation performed by a user on a remote control of the television 100. The first operation is used to trigger the television 100 to display the interface corresponding to the first task. After receiving the first operation, the remote control may send a corresponding control signal to the television 100. In response to the control signal, the television 100 may display, on the display, the interface corresponding to the first task.

In some other embodiments, the first operation may alternatively be voice data (for example, voice data a, namely, a voice command) of the first user collected by the television 100 by using a microphone. The voice data is used to control the television 100 to execute the first task, and display the interface corresponding to the first task. For example, the voice data a may be "xiaoyi, xiaoyi, play a carton", "xiaoyi, xiaoyi, play Go", "xiaoyi, xiaoyi, listen to the radio", or the like.

For example, the foregoing first operation is used to trigger the television 100 to play the carton "Peppa Pig", that is, the foregoing first task is "play Peppa Pig". In response to the first operation of a user a, the television 100 may display, on the display, the interface 301 corresponding to the first task, as shown in (a) in FIG. 3.

In this embodiment of this application, an example in which the television 100 displays, on the display in response to the voice data a, the interface corresponding to the first task is used to describe a principle in which the television 100 displays a corresponding interface on the display in response to voice data in this embodiment of this application.

The voice data a includes a wake-up word of the television 100. For example, the wake-up word may be used to wake up the television 100, to control the television to execute a voice control event. Before performing voice wake-up, the user needs to register, with the television 100, a wake-up word used to wake up a voice assistant. For example, the television 100 may receive a text of the wake-up word or a voice wake-up word entered by the user. For example, the wake-up word may be "xiaoyi, xiaoyi", "xiaoyi", or the like. In this embodiment of this application, an example in which the wake-up word is "xiaoyi, xiaoyi" is used to describe the method in this embodiment of this application.

In a first case, the wake-up word received by the television 100 is the text of the wake-up word entered by the user. In this case, a voice wake-up process may include: The television 100 detects voice data by using a low-power digital signal processor (Digital Signal Processor, DSP). When the DSP detects that a similarity between the voice data and the wake-up word meets a specific condition, the DSP delivers the detected voice data to an application processor (Application Processor, AP). The AP performs text verification on the voice data, to determine whether the voice data matches the wake-up word registered by the user. When the voice data matches the wake-up word, the television 100 executes a corresponding voice control event.

In a second case, the wake-up word that is registered by the user and that is received by the television 100 is the voice wake-up word. In this case, the television 100 may generate, based on the voice wake-up word entered by the user, a voiceprint model that can indicate a voiceprint feature of the wake-up word. A voice wake-up process may include: The television 100 detects voice data by using a low-power digital signal processor (Digital Signal Processor, DSP). When the DSP detects that a similarity between the voice data and the wake-up word meets a specific condition, the DSP delivers the detected voice data to an application processor (Application Processor. AP). The AP performs text verification and voiceprint verification on the voice data, to determine whether the voice data matches the generated voiceprint model. When the voice data matches the voiceprint model, the mobile phone may execute a corresponding voice control event.

It may be understood that the television 100 may receive voice wake-up words with a same text from one or more users, and generate, for each user, a voiceprint model used to indicate a voiceprint feature of a corresponding voice wake-up word. In this way, when receiving voice data that is sent by the one or more users and that includes the wake-up word, the television 100 may execute a corresponding voice control event.

It should be noted that the wake-up word in this embodiment of this application includes but is not limited to "xiaoyi, xiaoyi". The wake-up word may be a wake-up word with a fixed text that is preset in the television. Alternatively, the wake-up word may be any wake-up word set by the user. Specific content of the wake-up word is not limited in this embodiment of this application.

S202: The television 100 collects first voice data when displaying, on the display, the interface corresponding to the first task.

S203: In response to the fact that the first voice data includes a wake-up word of the television 100, the television 100 recognizes the first voice data.

In this embodiment of this application, an example in which the wake-up word of the television 100 is "xiaoyi, xiaoyi" is used to describe the method in this embodiment of this application. For example, the first voice data may be "xiaoyi, xiaoyi, next episode". "xiaoyi, xiaoyi, play Go", "xiaoyi, xiaoyi, watch a talk show", "xiaoyi, xiaoyi, play music", or the like. It should be noted that, when the user performs voice control on the television, each voice may start with the wake-up word. That is, the television needs to recognize whether each piece of voice data includes the wake-up word, and only if the wake-up word is included, the television executes a corresponding function of the voice data. Alternatively, the user may say a voice without the wake-up word after saying the wake-up word to wake up the voice control function of the television. That is, after the voice control function of the television is woken up, within a period of time, the television can process the voice without the wake-up word, and execute a corresponding function. In other words, the first voice data in S202 may carry the wake-up word, or may not carry the wake-up word. After the voice control function of the television is enabled, in some implementations, voice data that does not include the wake-up word can also be executed by the television. To prevent the television from being mistakenly triggered by a voice, voice data generally includes the wake-up word.

The first voice data is further used to trigger the television 100 to perform a second task. For example, the first voice data is "xiaoyi, xiaoyi, play Go". The first voice data is used to trigger the television 100 to start a Go application and display an interface of the Go application, that is, the second task is to play the Go. For another example, the first voice data is "xiaoyi, xiaoyi, play music". The first voice data is used to trigger the television 100 to start a music playing application and display an interface for playing music, that is, the second task is to play music.

It may be understood that the first voice data may be voice data of the first user, or may be voice data of another user (for example, the second user). For a method for recognizing, by the television 100, whether the first voice data is the voice data of the first user, refer to related descriptions in the following embodiments. Details are not described in this embodiment. Based on the fact that the first voice data is recognized as the voice data of the first user, the television 100 may stop executing the foregoing first task, and start executing the second task, that is, the television 100 may perform S204. Based on the fact that the first voice data is recognized as the voice data of the second user rather than the voice data of the first user, the television 100 may simultaneously execute the first task and the second task, that is, the television 100 may perform S205.

S204. The television 100 stops displaying the interface corresponding to the first task, and displays, on the display, an interface corresponding to the second task.

For example, it is assumed that in response to the first operation of the user a (that is, the first user) shown in (a) in FIG. 3, the television 10 displays the interface 301 corresponding to the first task.

For example, it is assumed that in a process of displaying the interface 301 shown in (a) in FIG. 3, the television 100 receives voice data "xiaoyi, xiaoyi, next episode" sent by the user a. In response to the fact that the voice data "xiaoyi, xiaoyi, next episode" includes the wake-up word "xiaoyi, xiaoyi", the television 100 may recognize that the voice data is the voice data of the user a (that is, the first user). The television 100 may stop executing the first task, that is, stop displaying the interface corresponding to the first task, and start executing the second task corresponding to the voice data, that is, start playing a next episode of the carton. For example, the television 100 may display an interface 302 corresponding to the second task shown in (b) in FIG. 3.

For another example, it is assumed that in a process of displaying the interface 301 shown in (a) in FIG. 3, the television 100 receives voice data "learn English" sent by the user a. In response to the fact that the voice data "xiaoyi, xiaoyi, learn English" includes the wake-up word "xiaoyi, xiaoyi", the television 100 may recognize that the voice data is the voice data of the user a (that is, the first user). The television 100 may stop displaying the interface corresponding to the first task, and display, on the display, the interface corresponding to the second task, that is, displaying an interface for learning English (not shown in the accompanying drawings).

S205: The television 100 displays, in a first display area of the display, the interface corresponding to the first task, and displays, in a second display area, the interface corresponding to the second task.

It may be understood that if the first voice data is the voice data of the second user rather than the voice data of the first user, it indicates that there may be two users who want the television 100 to simultaneously execute different tasks. In this case, the television may simultaneously execute the first task and the second task. In this embodiment of this application, the television 100 may display, in different display areas of the display, interfaces corresponding to different tasks. For example, the television 100 may display, in the first display area of the display, the interface corresponding to the first task, and display, in the second display area, the interface corresponding to the second task.

In this embodiment of this application, the display of the television 100 may be divided into a plurality of display areas. The plurality of display areas may include at least the first display area and the second display area.

For example, the display of the television 100 may be divided into two display areas, or may be divided into three display areas. For example, as shown in (a) in FIG. 4A, (b) in FIG. 4A, or (c) in FIG. 4A, the display of the television 100 may be divided into two display areas, including the first display area and the second display area. For another example, as shown in FIG. 4B, the display of the television 100 may be divided into three display areas, including the first display area, the second display area, and a third display area.

In this embodiment of this application, the method in this embodiment of this application is described by using an example in which the display of the television 100 may be divided into two display areas, that is, the plurality of display areas include the first display area and the second display area.

The first display area and the second display area each are a part of a display area of the display. The first display area and the second display area do not overlap. Sizes (including widths and heights) of the first display area and the second display area may be preset in the television 100. Alternatively, widths and heights of the first display area and the second display area may be set by the user in the television 100. In this embodiment, the sizes of the first display area and the second display area may be the same or different.

Figure 4A:
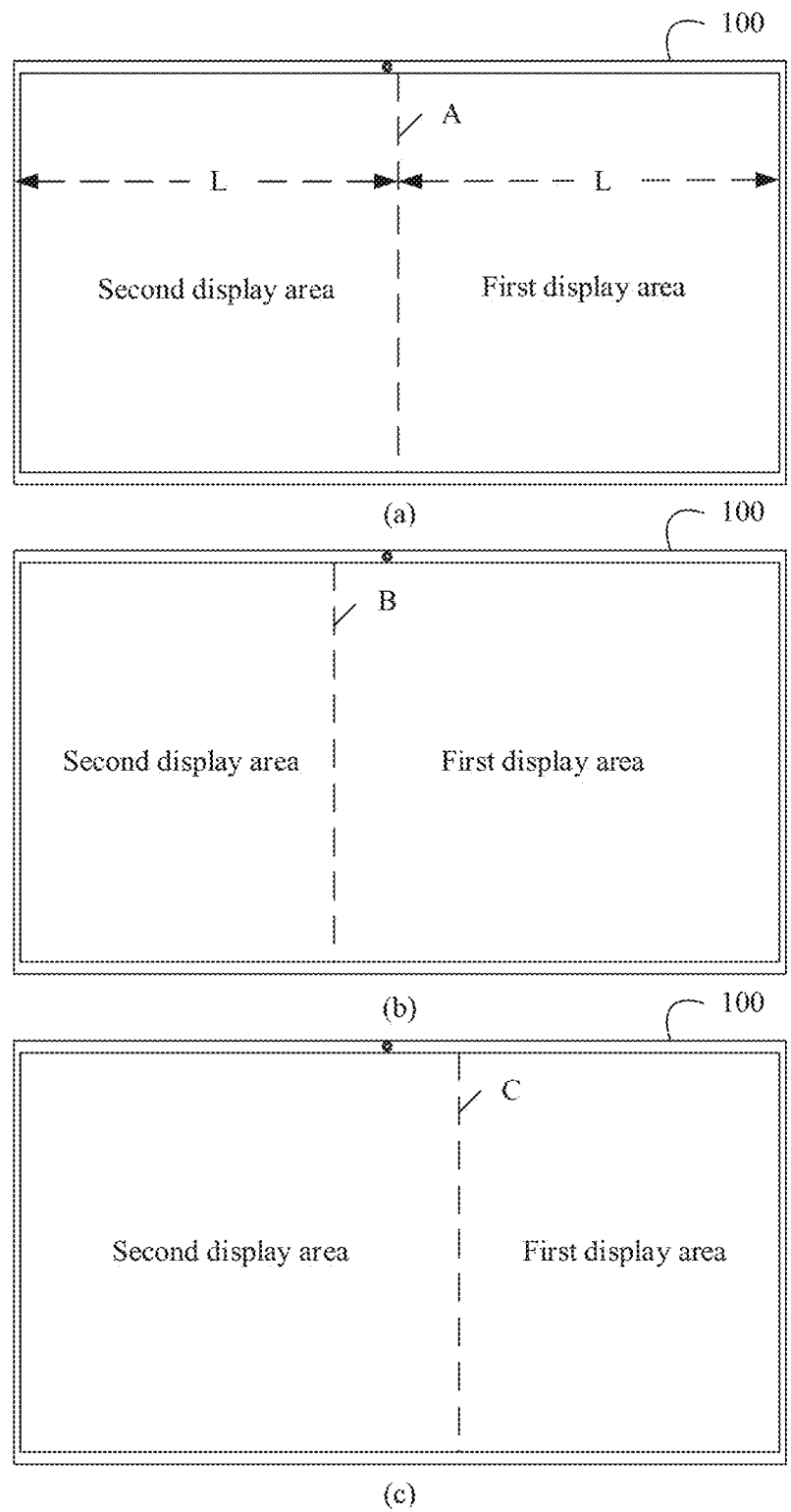
FIG. 4A is a schematic diagram of an example of a display area according to an embodiment of this application.
Figure 4B:
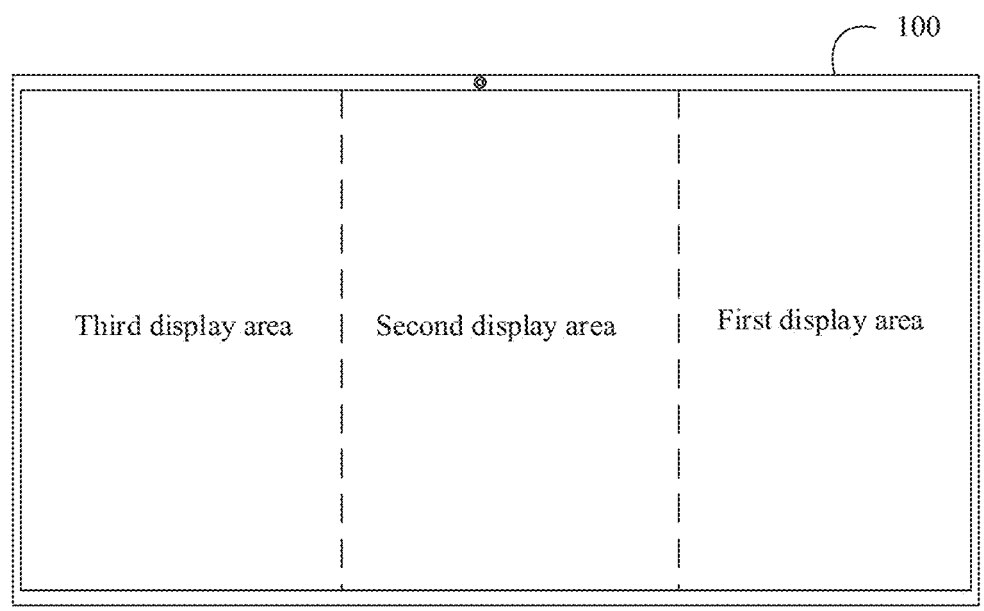
FIG. 4B is a schematic diagram of an example of a display area according to an embodiment of this application.

For example, as shown in (a) in FIG. 4A, the size of the first display area is the same as the size of the second display area. In (a) in FIG. 4A, the first display area and the second display area are bounded by a dividing line A, a height of the first display area is the same as a height of the second display area, and a width of the first display area and a width of the second display area each are a length L.

For another example, as shown in (b) in FIG. 4A or (c) in FIG. 4A, the size of the first display area is different from the size of the second display area. In (b) in FIG. 4A, the first display area and the second display area are bounded by a dividing line B, and the size of the first display area is greater than the size of the second display area. In (c) in FIG. 4A, the first display area and the second display area are bounded by a dividing line C, and the size of the first display area is less than the size of the second display area.

The first display area is close to a first side of the display, and the second display area is close to a second side of the display. The first side and the second side are left and right opposite sides of the display. For example, the first side is a right side of the display, and the second side is a left side of the display. Alternatively, the first side is a left side of the display, and the second side is a right side of the display. In this embodiment of this application, an example in which the first side is the right side of the display, and the second side is the left side of the display is used to describe the method in this embodiment of this application. For example, as shown in (a) in FIG. 4A, the first display area is close to the right side of the display, and the second display area is close to the left side of the display.

It should be noted that (a) in FIG. 4A, (b) in FIG. 4A, and (c) in FIG. 4A give only three possible embodiments of the first display area and the second display area by way of examples. In this embodiment of this application, the first display area and the second display area of the display include but are not limited to the display areas described in the foregoing example. In this embodiment of this application, the method in this embodiment of this application is described by using an example in which the size of the first display area is the same as the size of the second display area, that is, the first display area and the second display area shown in (a) in FIG. 4A are used as an example.

Figure 5A:
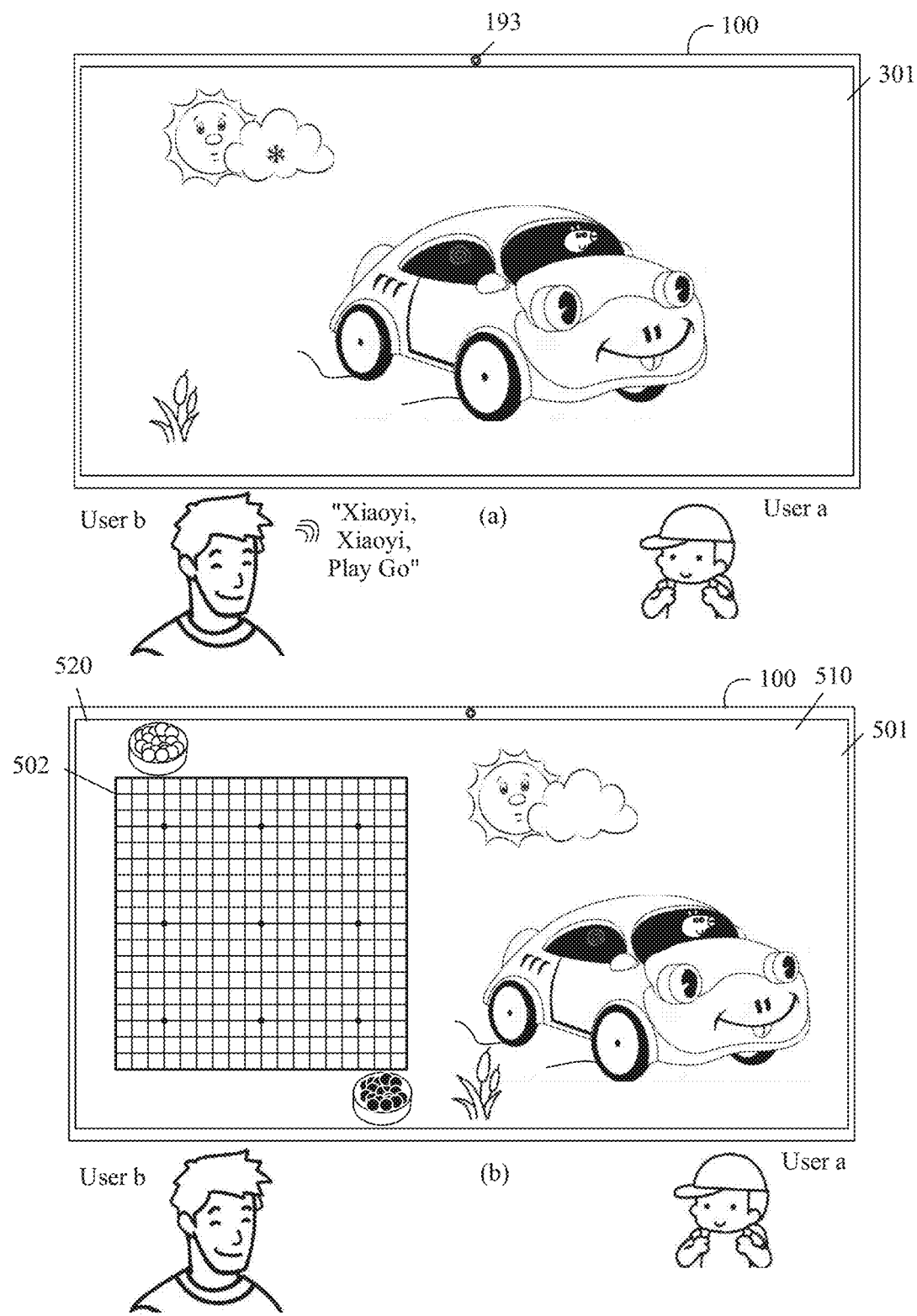
FIG. 5A is a schematic diagram of an example of another display interface of a television according to an embodiment of this application.

For example, it is assumed that in response to the first operation of the user a (that is, the first user) shown in (a) in FIG. 5A, the television 10 displays the interface 301 corresponding to the first task.

For example, it is assumed that in a process of displaying the interface 301 shown in (a) in FIG. 5A, the television 100 receives voice data "xiaoyi, xiaoyi, play Go" sent by a user b (that is, the second user). In response to the fact that the voice data "xiaoyi, xiaoyi, play Go" includes the wake-up word "xiaoyi, xiaoyi", the television 100 may recognize that the voice data is voice data of the user b. As shown in (b) in FIG. 5A, the television 100 may display, in a first display area 510, an interface 501 corresponding to the first task, and display, in a second display area 520, an interface 502 corresponding to the second task. Both the interface 301 shown in (a) in FIG. 5A and an interface 501 shown in (b) in FIG. 5A are interfaces corresponding to the first task.

In this embodiment of this application, when displaying an interface corresponding to a task in response to an operation of a user, the television 100 may further display interfaces corresponding to two tasks in a split-screen manner on the display in response to a voice command (namely, voice data) of another user. In other words, the television 100 may display interfaces corresponding to a plurality of tasks in a split-screen manner on the display in response to operations (for example, voice commands) of a plurality of users. This can enrich display content of the electronic device and improve utilization of the display of the television 100.

In this embodiment of this application, a method in which the television 100 recognizes whether the first voice data is the voice data of the first user in S203 is described.

After performing S201, the television 100 may determine a user identifier of the first user. The television 100 may determine the user identifier of the first user by using at least one of a face image or lip information of the first user that is collected by a camera, voiceprint information of the first user that is collected by a microphone, and the like. The user identifier may uniquely identify the first user. The television 100 may allocate a user identifier to the user based on at least one of a face image, lip information, voiceprint information, and the like of each user. The television 100 may store user identifiers of one or more users, and information such as a face image, lip information, or voiceprint information of the user identified by each user identifier.

After collecting the first voice data, the television 201 may collect, by using a camera, a face image or lip information of a user who sends the first voice data, collect, by using a microphone, voiceprint information of the user who sends the first voice data, and the like, and determines, with reference to the user identifier of the first user, whether the user who sends the first voice data is the first user. For example, the television 100 may compare the face image of the user who sends the first voice data with a face image of the first user, and determine whether the user who sends the first voice data is the first user.

Correspondingly, if the first voice data is the voice data of the second user, the television 100 may collect a face image or lip information of the second user by using the camera, collect voiceprint information of the second user by using the microphone, or the like, to determine a user identifier of the second user.

It may be understood that if the television 100 does not store the user identifier of the second user, the television 100 may allocate a user identifier to the second user. The television 100 may collect a face image or lip information of the second user by using the camera, collect voiceprint information of the second user by using the microphone, and the like. The television 100 may store a user identifier allocated by the second user, and a face image, lip information, voiceprint information, and the like that are of the second user and that are identified by the user identifier.

In some embodiments, the television 100 may further store a correspondence between the user identifier of the first user and the first task, and store a correspondence between the user identifier of the second user and the second task. In this way, the television 100 may determine a correspondence between a task executed by the television 100 and each user.

In addition, the television 100 may further record a location of the first user relative to the display and a location of the second user relative to the display. For example, the television 100 may determine the location of the first user or the second user relative to the display by using the microphone and/or the camera. For example, the television 100 may use the microphone to determine the location of the first user or the second user relative to the display by using an acoustic source localization technology. For another example, the television 100 may collect a face image by using the camera to determine the location of the first user or the second user relative to the display.

In this way, when the television 100 displays the interface corresponding to the first task and the interface corresponding to the second task in a split-screen manner on the display, the television 100 may display, in a display area close to the first user, the interface corresponding to the first task, and display, in a display area close to the second user, the interface corresponding to the second task, based on the locations of the first user and the second user relative to the display.

With reference to the foregoing description, the first display area is close to a first side (for example, a right side) of the display, and the second display area is close to a second side (for example, a left side) of the display. Before S205, the method in this embodiment of this application may further include: The television 100 determines, by using the camera and/or the microphone, that the first user is close to the first side of the display and the second user is close to the second side of the display.

It may be understood that the television 100 determines that the first user is close to the first side of the display and the second user is close to the second side of the display. In addition, the first display area is close to the first side of the display, and the second display area is close to the second side of the display. Therefore, the television 100 may perform S205 to display, in the first display area, the interface corresponding to the first task triggered by the first user, and display, in the second display area, the interface corresponding to the second task triggered by the second user instead of displaying, in the first display area, the interface corresponding to the second task triggered by the second user, and displaying, in the second display area, the interface corresponding to the first task triggered by the first user. For example, as shown in (b) in FIG. 5A, the television 100 may display, in the first display area 510, the interface 501 corresponding to the first task, and display, in the second display area 520, the interface 502 corresponding to the second task.

When the television 100 displays the interface corresponding to the first task and the interface corresponding to the second task in a split-screen manner on the display, the television 100 may display, in a display area close to the first user, the interface corresponding to the first task, and display, in a display area close to the second user, the interface corresponding to the second task, based on the locations of the first user and the second user relative to the display. This can help the user view an interface corresponding to a task triggered by the user, and help improve viewing experience of the user.

In some embodiments, in a process in which the television 100 displays the interface corresponding to the first task or the interface corresponding to the second task in a split-screen manner on the display, the locations of the first user and the second user relative to the display may change. For example, the first user may move from the first side (for example, a right side) of the display to the second side (for example, a left side) of the display, and the second user may move from the second side of the display to the first side of the display.

Based on this case, after S205 shown in FIG. 2, the method in this embodiment of this application may further include: The television 100 determines, by using the camera and/or the microphone, that the first user is close to the second side of the display and the second user is close to the first side of the display; and the television 100 displays, in the second display area, the interface corresponding to the first task, and displays, in the first display area, the interface corresponding to the second task.

For the method for determining, by the television 100 by using the camera and/or the microphone, the location of the first user or the second user relative to the display, refer to related descriptions in the foregoing embodiments. Details are not described in this embodiment of this application.

It can be learned from the foregoing embodiment that, in a case in which the first user is close to the first side of the display and the second user is close to the second side of the display, the television 100 displays, in the first display area close to the first side of the display, the interface corresponding to the first task triggered by the first user, and displays, in the second display area close to the second side of the display, the interface corresponding to the second task triggered by the second user. When detecting that the first user moves from the first side of the display to the second side of the display and the second user moves from the second side of the display to the first side of the display, the television 100 may display, in the first display area close to the first side of the display, the interface corresponding to the second task triggered by the second user, and display, in the second display area close to the second side of the display, the interface corresponding to the first task triggered by the first user.

Figure 5B:
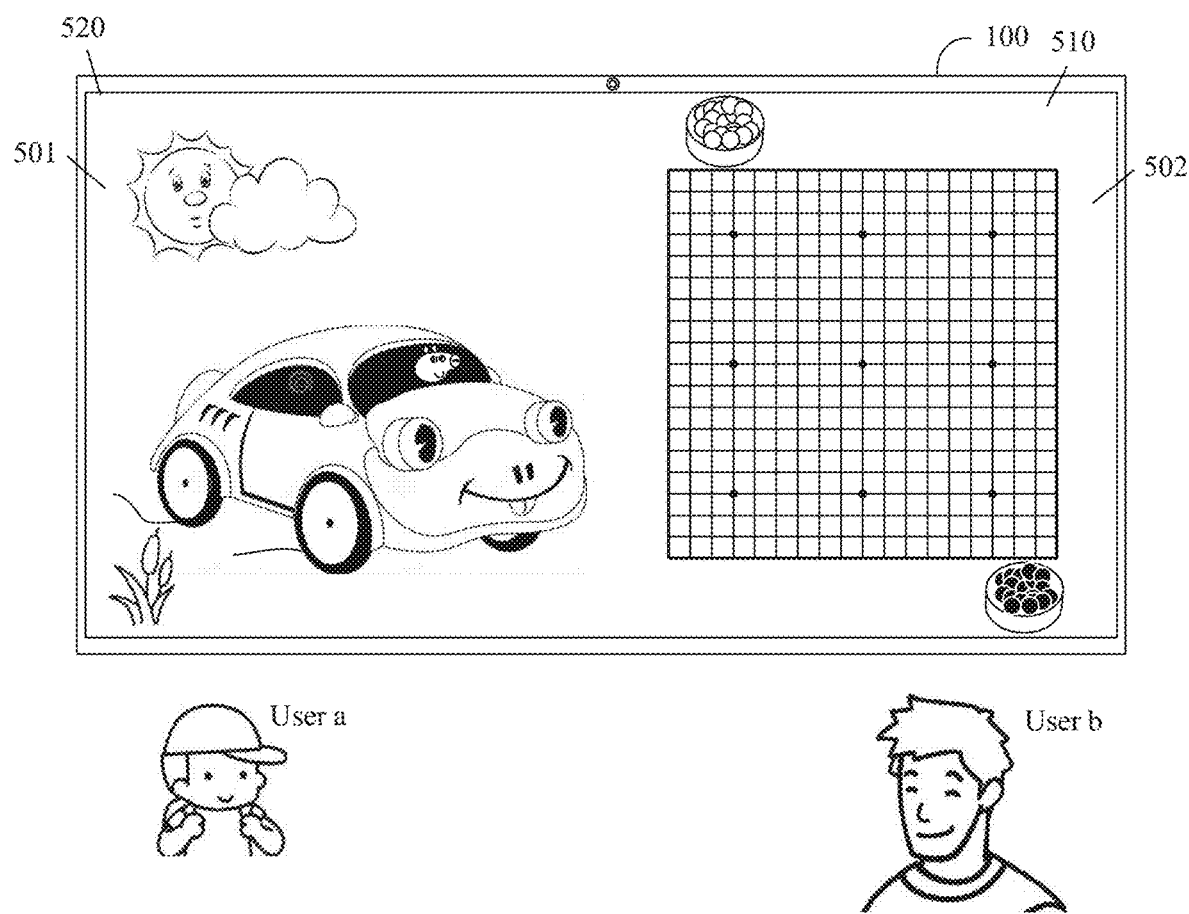
FIG. 5B is a schematic diagram of an example of another display interface of a television according to an embodiment of this application.

For example, as shown in (b) in FIG. 5A, the television 100 may detect that the user a (namely, the first user) is located on the right side (namely, the first side) of the display, and the user b (namely, the second user) is located on the left side (namely, the second side) of the display. Therefore, the television 100 may display, in the first display area 510, the interface 501 corresponding to the first task, and display, in the second display area 520, the interface 502 corresponding to the second task. The television 100 may detect that the user a moves from the right side of the display shown in (b) in FIG. 5A to the left side of the display shown in FIG. 5B, and the user b moves from the left side of the display shown in (b) in FIG. 5A to the right side of the display shown in FIG. 5B. In this case, as shown in FIG. 5B, the television 100 may display, in the first display area 510, the interface 502 corresponding to the second task, and display, in the second display area 520, the interface 501 corresponding to the first task.

In this embodiment of this application, the television 100 may monitor location movement of the user in real time. When the television displays the interface corresponding to the first task and the interface corresponding to the second task in a split-screen manner on the display, the television may display, in the display area close to the first user, the interface corresponding to the first task, and display, in the display area close to the second user, the interface corresponding to the second task, based on the real-time locations of the first user and the second user relative to the display. This can help the user view an interface corresponding to a task triggered by the user, and help improve viewing experience of the user.

It may be understood that a resource conflict may exist between the execution of the second task by the television 100 and the execution of the first task by the television 100. For example, if both the first task and the second task are audio and video tasks that need to use a sound box or a speaker of the television 100, such as "play music", "play a cartoon", or "play a talk show", there is a resource conflict between the execution of the second task by the television 100 and the execution of the first task by the television 100. For example, the television 100 cannot play a cartoon and a talk show in a split-screen manner.

Figure 6:
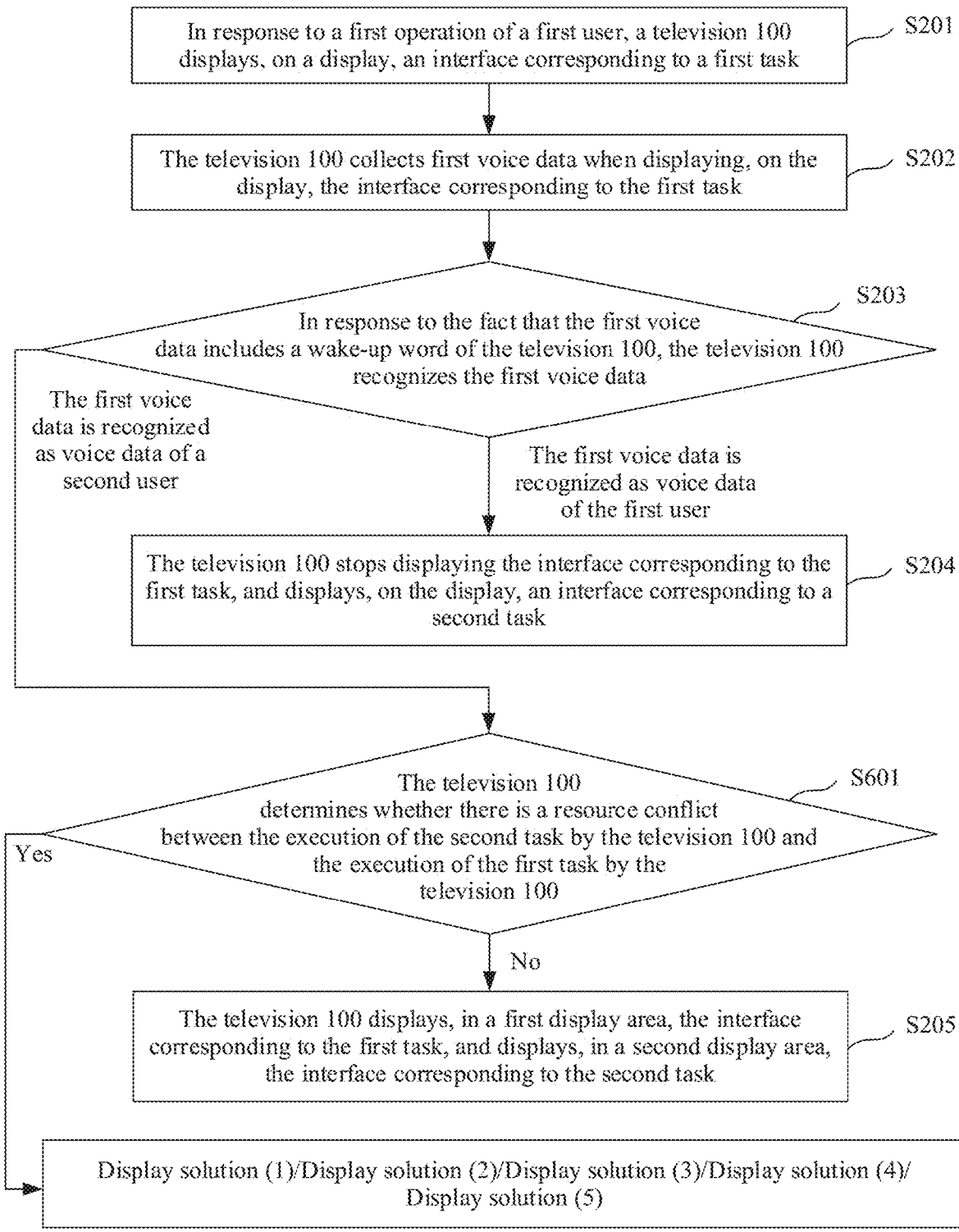
FIG. 6 is a flowchart of another voice-controlled split-screen display method according to an embodiment of this application.

To avoid the foregoing resource conflict, the television 100 may perform S205 only when determining that there is no resource conflict between the execution of the second task by the television 100 and the execution of the first task by the television 100. Specifically, as shown in FIG. 6, before S205 shown in FIG. 2, the method in this embodiment of this application may further include S601 based on the fact that the first voice data is recognized as the voice data of the second user.

S601: The television 100 determines whether there is a resource conflict between the execution of the second task by the television 100 and the execution of the first task by the television 100

For example, the resource conflict in this embodiment of this application may include an audio resource conflict. It may be understood that, when the television 100 displays interfaces corresponding to a plurality of tasks in a split-screen manner on the display, interfaces corresponding to different tasks are displayed in different display areas of the display. There is no resource conflict when the plurality of tasks occupy the display. However, if the television 100 executes the plurality of tasks, the audio resource (including the speaker 170A) of the television 100 needs to be used. In this case, the television 100 may simultaneously play audio data corresponding to the plurality of tasks, which affects a use experience of the user. In this case, there is an audio resource conflict when the plurality of tasks are executed.

For example, if the television 100 executes the second task and/or the television 100 executes the first task, only the display of the television 100 needs to be used, and no audio resource of the television 100 needs to be used. This indicates that there is no resource conflict between the execution of the second task by the television 100 and the execution of the first task by the television 100. If the audio resource of the television 100 needs to be used when the television 100 executes the second task and the television 100 executes the first task, it indicates that there is a resource conflict between the execution of the second task by the television 100 and the execution of the first task by the television 100.

If there is no resource conflict between the execution of the second task by the television 100 and the execution of the first task by the television 100, the television 100 may perform S205. For example, there is no resource conflict between "play Go" and "play a cartoon". Therefore, as shown in (b) in FIG. 5A, the television 100 may display, in the first display area 510, the interface 501 corresponding to the first task, and display, in the second display area 520, the interface 502 corresponding to the second task.

Alternatively, if there is a resource conflict between the execution of the second task by the television 100 and the execution of the first task by the television 100, the television 100 may have the following five display solutions:

Display solution (1): The television 100 continues to display the interface corresponding to the first task, but does not display the interface corresponding to the second task, on the display.

Display solution (2): The television 100 performs S204, stops displaying, on the display, the interface corresponding to the first task, and displays, on the display, the interface corresponding to the second task.

Display solution (3): The television 100 compares a user level of the first user with a user level of the second user. If the user level of the first user is higher than or equal to the user level of the second user, the television 100 displays the interface corresponding to the first task, but does not display the interface corresponding to the second task, on the display. If the user level of the first user is lower than the user level of the second user, the television 100 displays the interface corresponding to the second task, but does not display the interface corresponding to the first task, on the display.

The television 100 may store user identifiers of a plurality of users and a user level of each of the plurality of users.

In an implementation, the user level may be that the television 100 receives user settings. For example, when registering the wake-up word, the television 100 may receive a user level set for one or more users. For a specific method for registering the wake-up word by the television 100 and setting the user level by the television 100, refer to related descriptions in the conventional technology. Details are not described in this embodiment of this application. For example, the television 100 may receive a setting of the user, and set a user level of the user b (namely, an adult) shown in (a) in FIG. 5A to be higher than a user level of the user a (namely, a child).

A user level of a registered user (for example, the user a) in the television 100 is higher than a user level of an unregistered user (for example, a user c). If the television 100 stores a voice wake-up word of a user, it indicates that the user has been registered with the television 100. For example, it is assumed that both the user b and the user a have registered with the television 100, and the user level of the user b is higher than the user level of the user a. The user c is not registered with the television 100. Therefore, the user level of the user b is higher than the user level of the user a, and the user level of the user a is higher than the user level of the user c.

In another implementation, because features of voiceprint information and face images of users of different age groups are different, the television 100 may determine an age group of a user based on voiceprint information and a face image of the user. Then, the television 100 may determine a user level of the user based on the age group of the user. For example, an older user indicates a higher user level of the user. For example, if an age of a user is over 50, a user level of the user is the highest, such as level 1. If an age of a user ranges from 20 to 50, a user level of the user is level 2. If an age of a user is under 20, a user level of the user is level 3.

Optionally, after S601, if there is a resource conflict between the execution of the second task by the television 100 and the execution of the first task by the television 100, the television 100 may send prompt information. The prompt information is used to prompt that the television 100 cannot currently display the interface corresponding to the first task or the interface corresponding to the second task in a split-screen manner. For example, the prompt information may be text prompt information, for example, "a resource conflict occurs, and the television cannot display a plurality of interfaces in a split-screen manner". Alternatively, the prompt information may be voice prompt information. This is not limited in this embodiment of this application.

Display solution (4): The television 100 displays, in the first display area, the interface corresponding to the first task, and displays, in the second display area, the interface corresponding to the second task. However, the television 100 plays audio data of only one of the first task and the second task. That is, the audio resource of the television 100 is used by one of the first task and the second task.

The television 100 may randomly select to play audio data of any one of the first task or the second task. Alternatively, the television 100 may display a third interface (not shown in the accompanying drawings). The third interface is used to prompt the user to confirm that the television 100 plays the audio data of any one of the first task or the second task.

Alternatively, the television 100 may compare a user level of the first user with a user level of the second user. If the user level of the first user is higher than or equal to the user level of the second user, the television 100 plays the audio data of the first task, but does not play the audio data of the second task. If the user level of the first user is lower than the user level of the second user, the television 100 plays the audio data of the second task, but does not play the audio data of the first task.

Display solution (5): The television 100 displays a first interface, where the first interface is used to prompt the user to confirm that the television 100 executes the first task or the second task. In response to a second operation performed by the user on the first interface, the television 100 displays the interface corresponding to the first task, but does not display the interface corresponding to the second task, on the display. In response to a third operation performed by the user on the first interface, the television 100 displays the interface corresponding to the second task, but does not display the interface corresponding to the first task, on the display. The second operation is used to indicate the television 100 to display, on the display, the interface corresponding to the first task. The third operation is used to indicate the television 100 to display, on the display, the interface corresponding to the second task.

Figure 7:
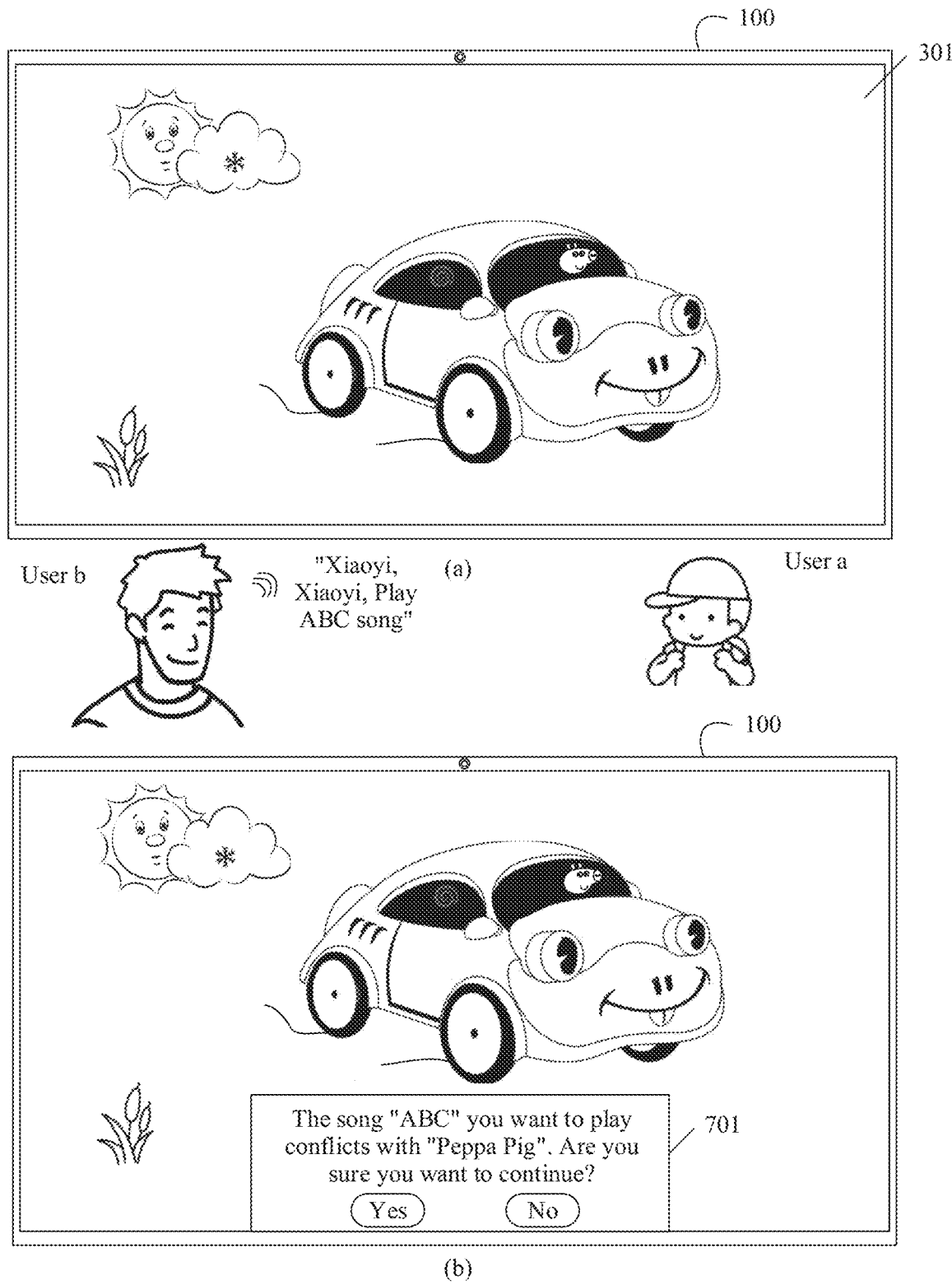
FIG. 7 is a schematic diagram of an example of another display interface of a television according to an embodiment of this application.

For example, as shown in (a) in FIG. 7, the television 100 displays, on the display, the interface 301 corresponding to the first task, that is, the television 100 plays the cartoon "Peppa Pig". As shown in (a) in FIG. 7, the television 100 receives first voice data (for example, "xiaoyi, xiaoyi, play ABC song") of the user b (namely, the second user). The first voice data "xiaoyi, xiaoyi, play ABC song" is used to trigger the television 100 to play the song "ABC" (namely, the second task). The television 100 performs S601, and may determine that there is a resource conflict between playing the song "ABC" by the television 100 and playing "Peppa Pig" by the television 100. Therefore, the television 100 may display a first interface 701 shown in (b) in FIG. 7. The first interface 701 includes prompt information: "The song "ABC" you want to play conflicts with "Peppa Pig". Are you sure you want to continue?" The first interface 701 may further include a "yes" button and a "no" button. In response to a tapping operation of the user on the "no" button (namely, the foregoing second operation), the television 100 may continue to play the cartoon "Peppa Pig" on the display, that is, display the interface corresponding to the first task. In response to a tapping operation of the user on the "yes" button (namely, the foregoing third operation), the television 100 may play the song "ABC" on the display, and display a corresponding song playing interface, that is, the television 100 may display the interface corresponding to the second task.

Optionally, the second operation may alternatively be voice data (namely, a voice command) that is received by the television 100 and that is sent by the user and is used to trigger the television 100 to display the interface corresponding to the first task. For example, the second operation may be that the television 100 receives a voice command "no", "do not play", or the like. The third operation may alternatively be voice data (namely, a voice command) that is received by the television 100 and that is sent by the user and is used to trigger the television 100 to display the interface corresponding to the second task. For example, the third operation may be that the television 100 receives a voice command "yes", "play", or the like.

In this embodiment of this application, when there is no resource conflict between the execution of the second task by the television 100 and the execution of the first task by the television 100, the television 100 may display the interface corresponding to the first task or the interface corresponding to the second task in a split-screen manner on the display. This can ensure program playback quality of the first task or the second task executed by the television 100, and reduce impact on viewing experience of the user.

In a process in which the television 100 performs S205, the first user or the second user may leave and no longer watch the television 100. For example, the television 100 may collect a face image by using a camera. If the television 100 does not detect a face image of the first user within a preset time period (for example, a first preset time period), it indicates that the first user has left and does not watch the television 100 any longer. In this case, to improve viewing experience of another user (for example, the second user), the television 100 may no longer display the interface corresponding to the first task.

Figure 8A:
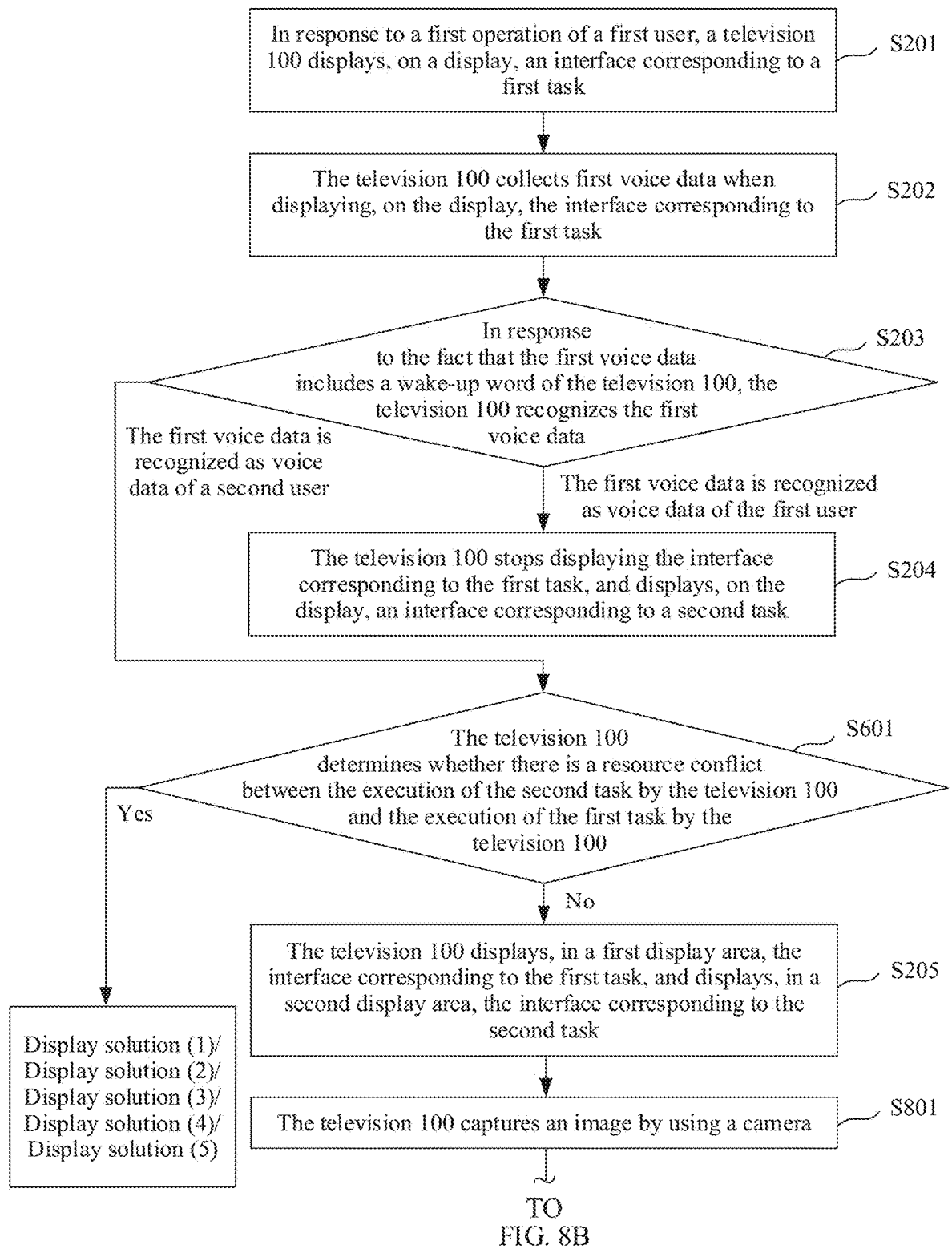
FIG. 8A and FIG. 8B are a flowchart of another voice-controlled split-screen display method according to an embodiment of this application.
Figure 8B:
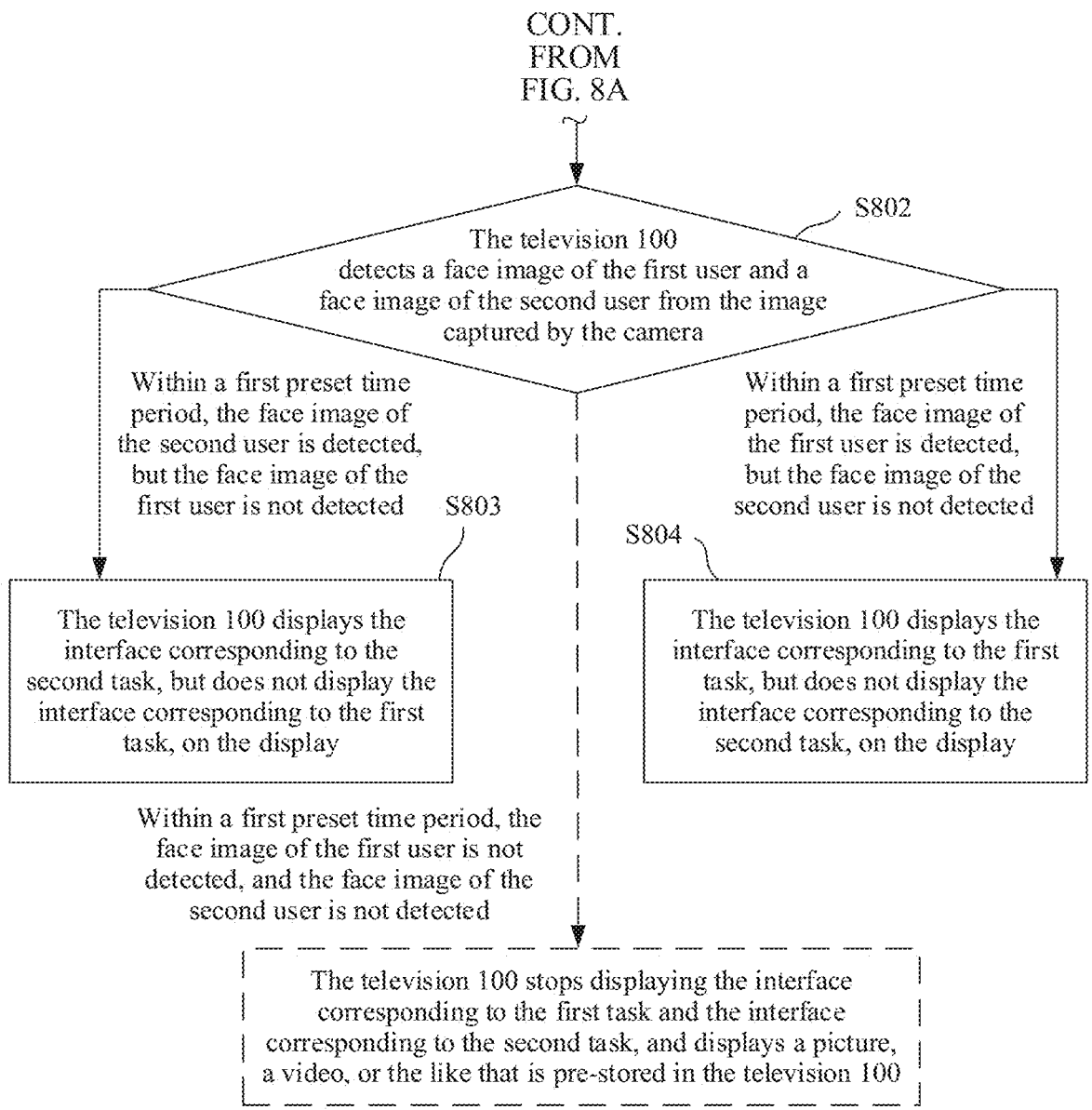

Specifically, the method in this embodiment of this application may further include S801 to S804. For example, as shown in FIG. 8A and FIG. 8B, the method in this embodiment of this application may further include S801 to S804 after S205.

S801: The television 100 captures an image by using a camera.

S802: The television 100 detects a face image of the first user and a face image of the second user from the image captured by the camera.

Specifically, if the television 10 detects the face image of the second user within the first preset time period, but does not detect the face image of the first user. S803 is performed. If the television 100 detects the face image of the first user within the first preset time period, but does not detect the face image of the second user, S804 is performed. The first preset time period is preset duration starting from when the television 100 performs S205. For example, a time length of the first preset time period may be 5 minutes, 8 minutes, 10 minutes, 15 minutes, or the like. The time length of the first preset time period may be preconfigured in the television 100. Alternatively, the time length of the first preset time period may be set by the user.

S803: The television 100 displays the interface corresponding to the second task, but does not display the interface corresponding to the first task, on the display.

It may be understood that if the television 100 detects the face image of the second user within the first preset time period, but does not detect the face image of the first user, it indicates that there is a relatively high possibility that the second user still watches the television 100 in front of the television 100, and there is a high probability that the first user has left and no longer watches the television 100. In this case, to improve viewing experience of the second user who still watches the television 100, the television 100 may display the interface corresponding to the second task, but not display the interface corresponding to the first task, on the display. If the television 100 does not display, on the display, the interface corresponding to the first task, it indicates that the television 100 currently does not execute the first task or suspends the execution of the first task.

For example, an example in which the television 100 performs S205 to display the interface shown in (b) in FIG. 5A is used. It is assumed that the television 100 detects a face image of the user b, but does not detect a face image of the user a within a first preset time period starting from when the television 100 displays the interface shown in (b) in FIG.

5A. In this case, the television 100 may display only the interface corresponding to the second task, but does not display the interface corresponding to the first task, on the display. For example, the television 100 may display an interface 901 shown in FIG. 9, that is, display the interface for playing the Go.

S804: The television 100 displays the interface corresponding to the first task, but does not display the interface corresponding to the second task, on the display.

It may be understood that if the television 100 detects the face image of the first user within the first preset time period, but does not detect the face image of the second user, it indicates that there is a relatively high possibility that the first user still watches the television 100 in front of the television 100, and there is a high probability that the second user has left and no longer watches the television 10. In this case, to improve viewing experience of the first user who still watches the television 100, the television 100 may display the interface corresponding to the first task, but not display the interface corresponding to the second task, on the display. If the television 100 may not display, on the display, the interface corresponding to the second task, it indicates that the television 100 currently does not execute the second task or suspends the execution of the second task.

For example, an example in which the television 100 performs S205 to display the interface shown in (b) in FIG. 5A is used. It is assumed that the television 100 detects a face image of the user a, but does not detect a face image of the user b within a first preset time period starting from when the television 100 displays the interface shown in (b) in FIG. 5A. In this case, the television 100 may display, on the display, only the interface corresponding to the first task, but not the interface corresponding to the second task. For example, as shown in (a) in FIG. 5A, the television 100 may play the cartoon "Peppa Pig".

After S802, if the television 100 does not detect the face image of the first user within the first preset time period, and does not detect the face image of the second user within the first preset time, it indicates that there is a relatively high possibility that both the first user and the second user have left and do not watch the television 100. In this case, to reduce power consumption of the television 100, the television 100 may stop displaying the interface corresponding to the first task and the interface corresponding to the second task. Optionally, after stopping displaying the interface corresponding to the first task and the interface corresponding to the second task, the television 100 may display a picture, a video, or the like that is pre-stored in the television 100.

In this embodiment of this application, when detecting that a user has left the television 100 and no longer watches the television 100, the television 100 may stop displaying an interface corresponding to a task triggered by the user, and display, on the entire display, an interface corresponding to a task triggered by a user who still watches the television 100. In this way, the television 100 may display, in a large display area, the interface corresponding to the task triggered by the user who still watches the television 100. This can improve viewing experience of the user who still watches the television 100.

After the first user leaves and no longer watches the television 100, the television may perform S803. After S803, the first user may return and continue to watch the interface that corresponds to the first task and that is displayed by the television 100. For example, the user a may temporarily leave for going to the toilet or other things and stop watching the television 100. However, after a period of time, the user a may return to continue watching the television 100. Based on this case, after S803, if the television 100 re-detects the face image of the first user and the face image of the second user within a second preset time period after the first preset time period, it indicates that the first user returns to continue to watch the television 100. For example, a time length of the second preset time period may be 3 minutes, 4 minutes, 5 minutes, 8 minutes, or the like. The time length of the second preset time period may be preconfigured in the television 100. Alternatively, the time length of the second preset time period may be set by the user.

In this case, the television 100 may display, in the first display area, the interface corresponding to the first task, and display, in the second display area, the interface corresponding to the second task. Alternatively, the television 100 may display, in the second display area, the interface corresponding to the first task, and display, in the first display area, the interface corresponding to the second task. Specifically, the television 100 may display, in the display area close to the first user, the interface corresponding to the first task, and display, in the display area close to the second user, the interface corresponding to the second task, based on the locations of the first user and the second user relative to the display.

After S802, if the television 100 detects the face image of the second user within the first preset time period, but does not detect the face image of the first user, although S803 is performed and the television 100 does not display, on the display, the interface corresponding to the first task, the television 100 may save a task progress of the first task. In this way, when the television 100 re-detects the face image of the first user within the second preset time period, the television 100 may re-display, in one display area of the display based on the task progress of the first task, the interface corresponding to the first task, and display, in another display area, the interface corresponding to the second task.

Figure 9:
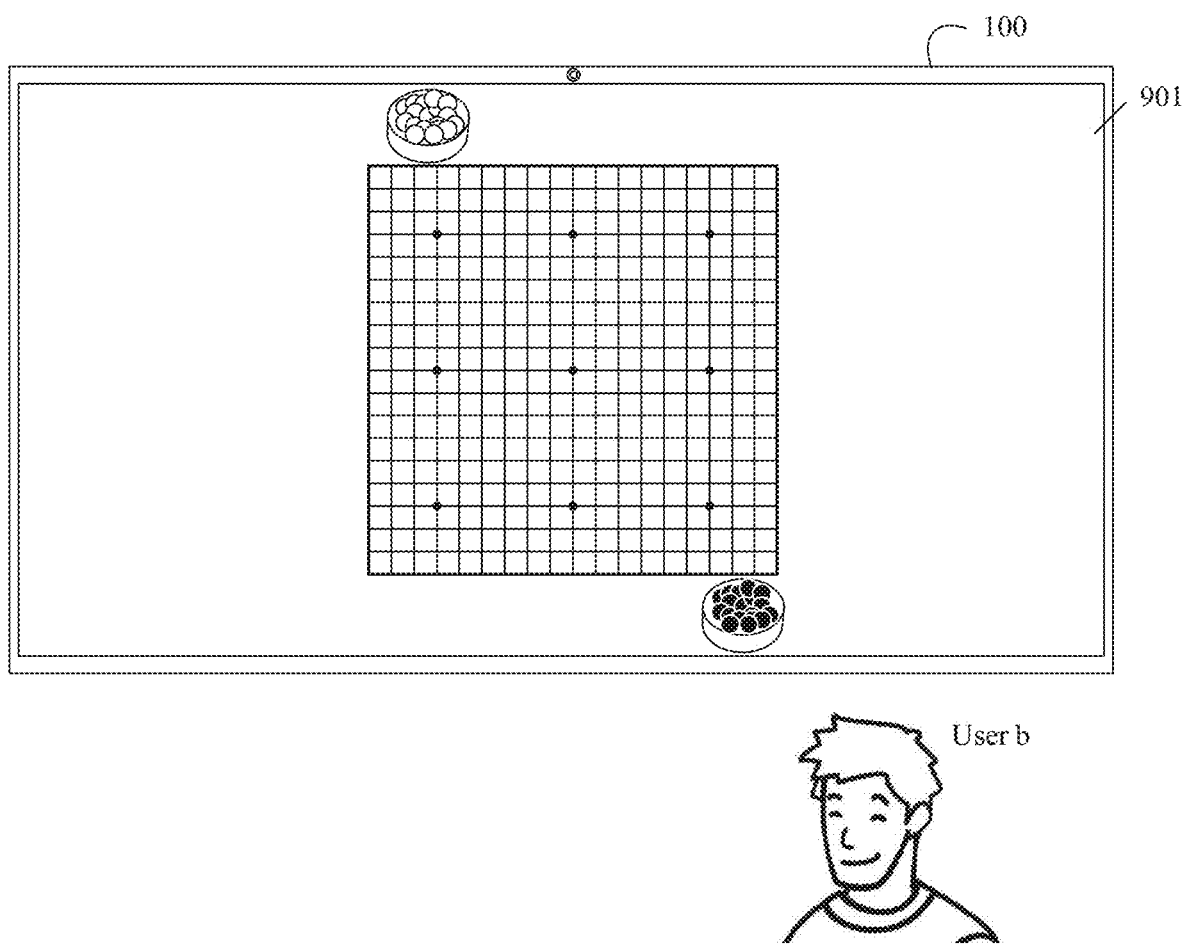
FIG. 9 is a schematic diagram of an example of another display interface of a television according to an embodiment of this application.

For example, the television 100 performs S803 to display an interface 901 (that is, the interface corresponding to the second task) shown in FIG. 9. The first task is to play the cartoon "Peppa Pig", and the task progress of the first task is a playback progress of the cartoon "Peppa Pig". In a process in which the television 100 displays the interface 901 shown in FIG. 9, if detecting the face image of the user a within the second preset time period, the television 100 may re-display the interface shown in FIG. 5B or the interface shown in (b) in FIG. 5A in a split-screen manner.

Further, if the television 100 does not detect the face image of the first user within the second preset time period, the television 100 may continue to perform S803 to display the interface corresponding to the second task, but does not display the interface corresponding to the first task, on the display.

It should be noted that if the television 100 does not detect the face image of the first user within the second preset time period, even if the television 100 detects the face image of the first user after the second preset time period, the television 100 does not automatically display the interface corresponding to the first task. If the television 100 does not detect the face image of the first user within the second preset time period, the television 100 may release the first task, and delete the task progress of the first task.

Correspondingly, after the second user leaves and no longer watches the television 100, the television may perform S804. After S804, the second user may return and continue to watch the interface corresponding to the second task displayed on the television 100. Specifically, after S804, if the television 100 detects the face image of the second user and the face image of the second user within the second preset time period after the first preset time period, it indicates that the second user returns to continue to watch the television 100. In this case, the television 100 may display, in the first display area, the interface corresponding to the first task, and display, in the second display area, the interface corresponding to the second task. Alternatively, the television 100 may display, in the second display area, the interface corresponding to the first task, and display, in the first display area, the interface corresponding to the second task.

In this embodiment of this application, when detecting that a user leaves the television 100 and no longer watches the television 100, the television 100 may stop displaying, on the display, an interface corresponding to a task triggered by the user. However, when it is detected that the user returns to continue to watch the television 100 within the second preset time period, the interface corresponding to the first task may be re-displayed in the display area of the display. In other words, if the user returns to continue to watch the television 100 within the second preset time period, the television 100 may automatically resume displaying the interface corresponding to the task triggered by the user. This can make the television 100 more intelligent, improve interaction performance between the television 100 and the user, and further improve user experience of using the television 100.

It can be learned from the foregoing embodiment that the display of the television 100 may be divided into a plurality of display areas. Each of the plurality display areas may display an interface corresponding to one task. It is assumed that the display of the television 100 may be divided into a maximum of M display areas. M≥2, and M is a positive integer. In this case, the television 100 may display, on the display, interfaces corresponding to M tasks in a split-screen manner. A preset task threshold is the same as a quantity of display areas in the plurality of display areas.

In this embodiment of this application, after the television 100 performs S203 to recognize that the first voice data is the voice data of the second user, and before S205 is performed, the television 100 may determine whether a total quantity of tasks currently executed by the television 100 is equal to the preset task threshold. The preset task threshold is the same as the quantity (namely, M) of display areas in the plurality of display areas.

If the total quantity of tasks currently executed by the television 100 is less than the preset task threshold, it indicates that the television 100 may display, in a display area of the display in response to the first voice data, the interface corresponding to the second task. In this case, the television 100 may perform S205 to display, in the first display area, the interface corresponding to the first task, and display, in the second display area, the interface corresponding to the second task.

If the total quantity of tasks currently executed by the television 100 is equal to the preset task threshold, it indicates that the television 100 has no new display area to display the interface corresponding to the second task. In this case, the television 100 may display a corresponding interface by using any one of the display solution (1) to the display solution (5).

For example, it is assumed that M=2, that is, the preset task threshold is 2. To be specific, the display of the television 100 includes two display areas, namely, the first display area and the second display area. That is, the television 100 may display an interface corresponding to a task in a split-screen manner in the first display area of the display, and display, in the second display area, an interface corresponding to a second task.

With reference to the foregoing example, when displaying the interface 301 shown in (a) in FIG. 5A, the television 100 receives the first voice data, for example, "xiaoyi, xiaoyi, play Go". After the television 100 recognizes that the first voice data is the voice data of the user b, and before S205 is performed, the television 100 currently executes a task "play Peppa Pig". That is, a total quantity of tasks currently executed by the television 100 is 1, and the total quantity of tasks currently executed by the television 100 is less than the preset task threshold (for example, 2). Therefore, as shown in (b) in FIG. 5A, the interface 501 corresponding to the first task is displayed in the first display area 510, and the interface 502 corresponding to the second task is displayed in the second display area 520.

Optionally, if a total quantity of tasks currently executed by the television 100 is equal to the preset task threshold, the television 100 may send first prompt information. The first prompt information is used to prompt that the television 100 cannot currently execute the second task. For example, the television 100 may display the first prompt information on the display. For another example, the first prompt information may be voice prompt information such as "the television 100 cannot currently display an interface for playing Go."

In some embodiments, after S205, the television 100 may further receive voice data (for example, second voice data) sent by the first user, the second user, or another user (for example, the third user). The second voice data is further used to trigger the television 100 to perform a third task.

It can be learned with reference to the foregoing embodiment that the television 100 stores a correspondence between a user identifier and a task. Therefore, if the second voice data is the voice data sent by the first user, the television 100 may display, in a display area (that is, the foregoing first display area) that displays the interface corresponding to the first task, the interface corresponding to the third task. The second display area still displays the interface corresponding to the second task. If the second voice data is the voice data sent by the second user, the television 100 may display, in a display area (that is, the foregoing second display area) that displays the interface corresponding to the second task, the interface corresponding to the third task. The first display area still displays the interface corresponding to the first task.

Figure 10A:
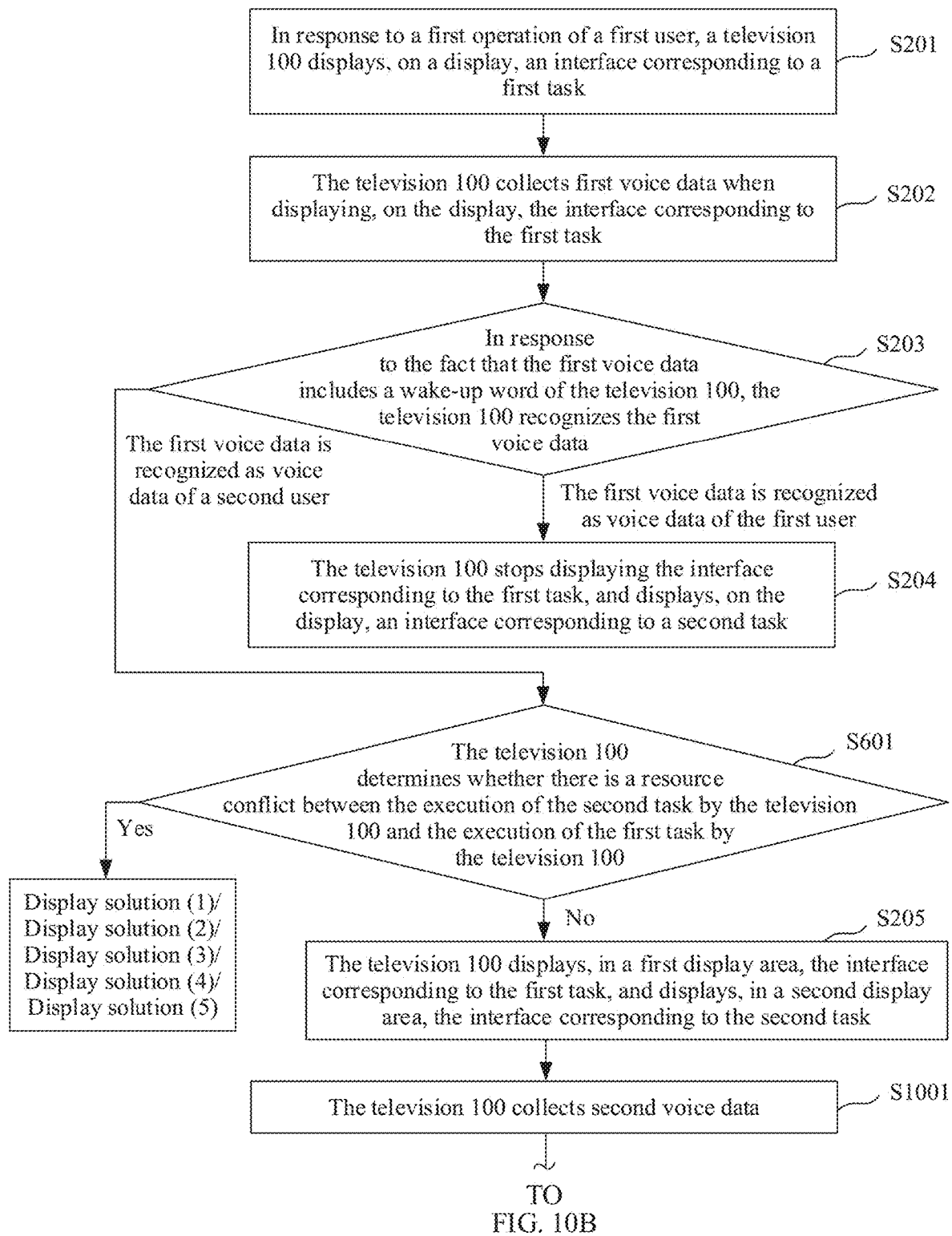
FIG. 10A.
Figure 10B:
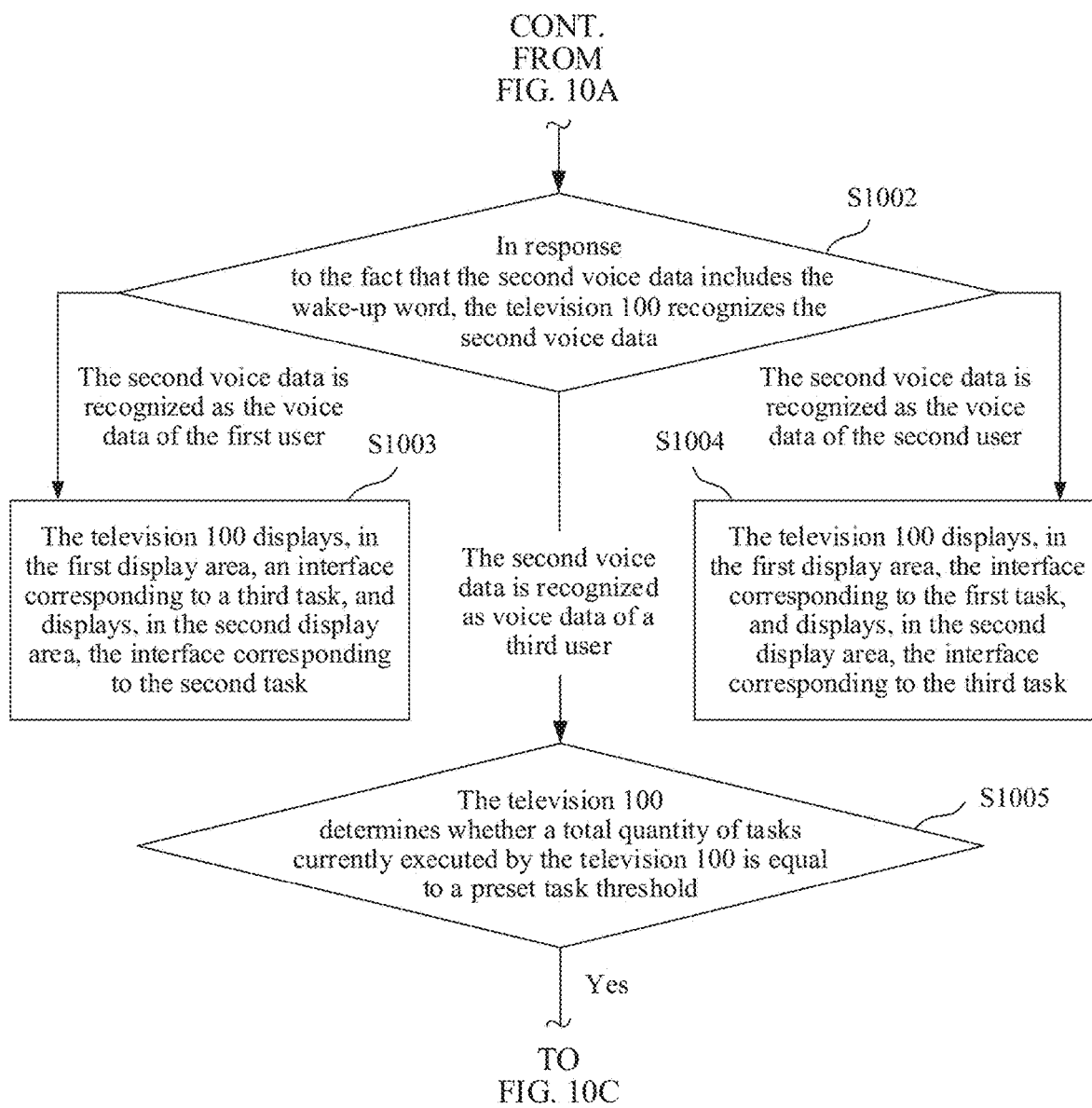
FIG. 10B, and FIG. 10C are a flowchart of another voice-controlled split-screen display method according to an embodiment of this application.
Figure 10C:
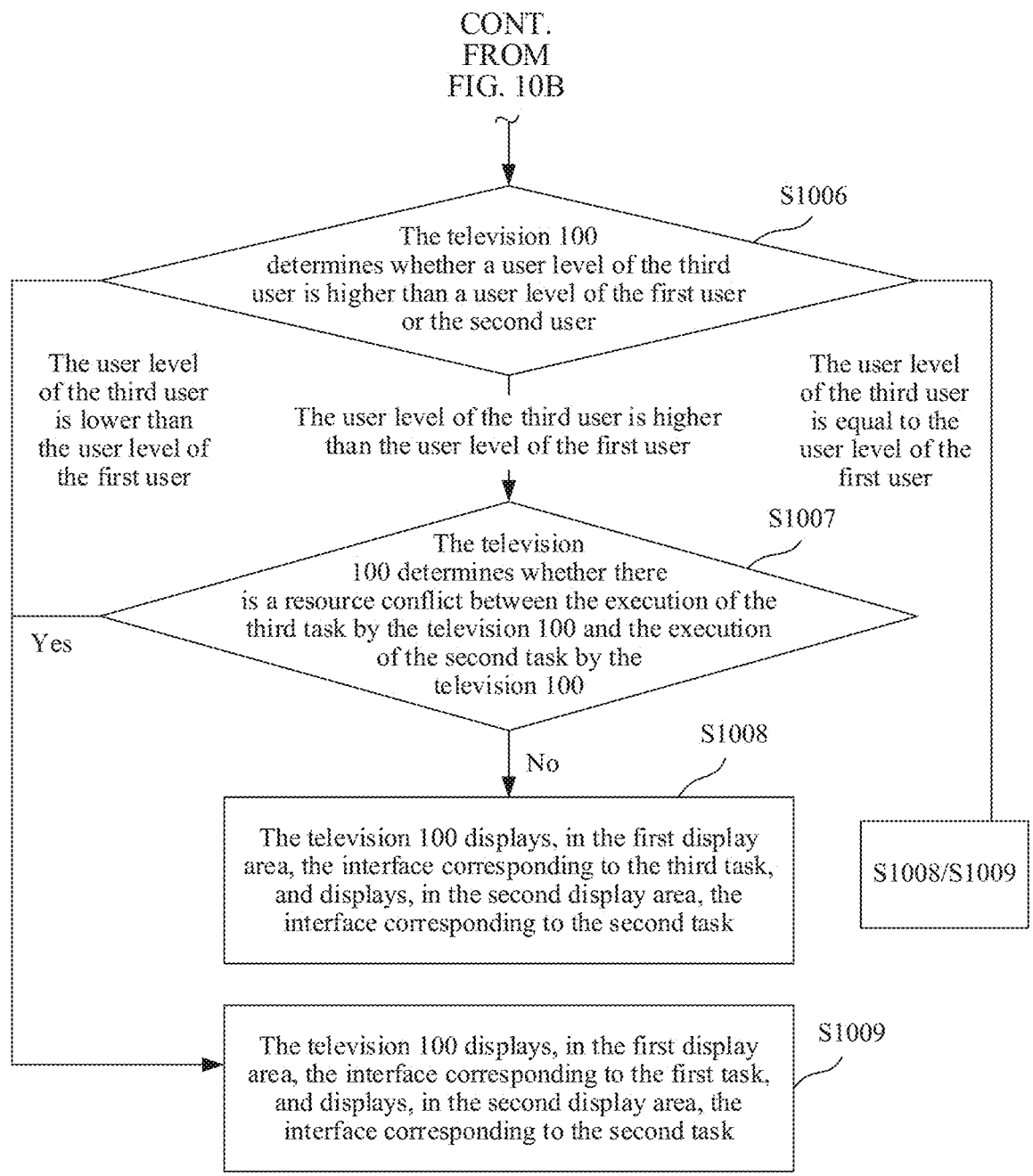

Specifically, after step S205, the method provided in this embodiment of this application may further include steps S1001 to S1009. For example, as shown in FIG. 10A, FIG. 10B, and FIG. 10C, after S205 shown in FIG. 6, the method in this embodiment of this application may further include S1001 to S1009.

S1001: The television 100 collects the second voice data.

The second voice data may be the voice data sent by the first user, the second user, or another user (for example, the third user).

S1002: In response to the fact that the second voice data includes a wake-up word, the television 100 recognizes the second voice data.

The television 100 may recognize that the second voice data is the voice data sent by the first user, the second user, or the third user (namely, another user other than the first user and the second user). For a method for recognizing, by the television 100, voice data of a user whose voice data is the second voice data, refer to a related method in the foregoing embodiment. Details are not described in this embodiment of this application.

In S205, the television 100 displays, in the first display area, the interface corresponding to the first task triggered by the first user, and displays, in the second display area, the interface corresponding to the second task triggered by the second user. In this case, if the second voice data is recognized as the voice data of the first user, it indicates that the first user may want to control the television 100 to stop executing the first task, and control the television 100 to execute the third task. In this case, the television 100 may display, in the first display area that originally displays the interface corresponding to the first task, the interface corresponding to the third task, and still display, in the second display area, the interface corresponding to the second task. Specifically, after S1002, if the second voice data is the voice data of the first user, the television 100 may perform S1003.

If the second voice data is recognized as the voice data of the second user, it indicates that the second user may want to control the television 100 to stop executing the second task, and control the television 100 to execute the third task. In this case, the television 100 may display, in the second display area that originally displays the interface corresponding to the second task, the interface corresponding to the third task, and still display, in the first display area, the interface corresponding to the first task. Specifically, after S1002, if the second voice data is the voice data of the second user, the television 100 may perform S1004.

If the second voice data is recognized as the voice data of the third user, that is, the second voice data is neither the voice data of the first user nor the voice data of the second user, it indicates that a new user wants to control the television 100 to perform the third task. In this case, the television 100 may perform S1005.

S1003: The television 100 displays, in the first display area, the interface corresponding to the third task, and displays, in the second display area, the interface corresponding to the second task.

For example, the first user is the user a, and the second user is the user b. As shown in (b) in FIG. 5A, the television 100 performs S205 to display, in the first display area 510, the interface 501 corresponding to the first task, and display, in the second display area 520, the interface 502 corresponding to the second task. The interface 501 corresponding to the first task is an interface for playing the cartoon "Peppa Pig". The interface 502 corresponding to the second task is an interface for playing the Go.

Figure 11:
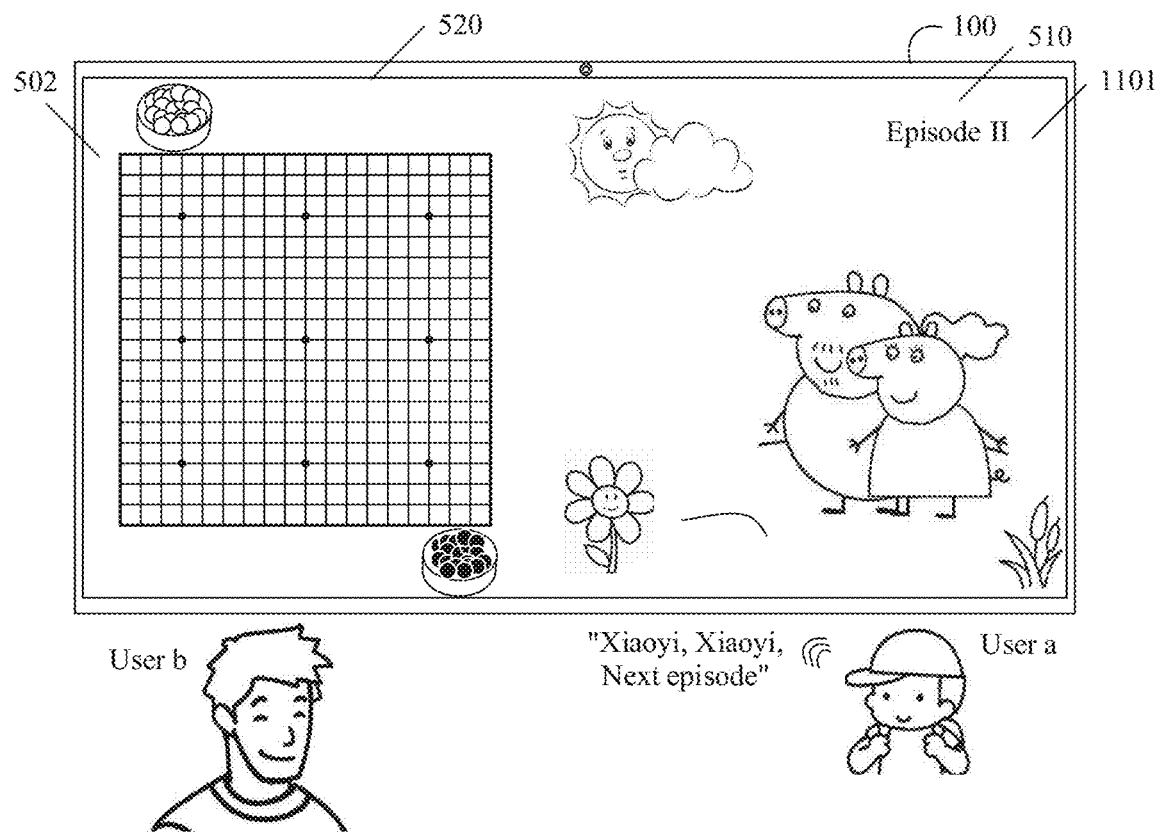
FIG. 11 is a schematic diagram of an example of another display interface of a television according to an embodiment of this application.

In a process in which the television 100 plays the cartoon "Peppa Pig" and displays the interface for playing the Go, the television 100 may receive the second voice data sent by the user a (namely, the first user), for example, "xiaoyi, xiaoyi, next episode". The television 100 may perform S1002 to determine that the second voice data is the voice data of the user a. Therefore, in response to the second voice data "xiaoyi, xiaoyi, next episode", as shown in FIG. 11, the television 100 may play a next episode of "Peppa Pig" in the first display area 510, that is, display the interface 1101 corresponding to the third task. As shown in FIG. 11, the television 100 still displays, in the second display area 520, the interface 502 corresponding to the second task.

In implementation (1), the third task may be a subtask of the first task. For example, the first task is to play the cartoon "Peppa Pig" shown in (b) in FIG. 5A. If the second voice data is "xiaoyi, xiaoyi, next episode", the third task that the second voice data triggers the television 100 to execute is to play a next episode of "Peppa Pig", and the third task is a subtask of the first task. For another example, the first task is to play the song "ABC". If the second voice data is "xiaoyi, xiaoyi, next song", the third task that the second voice data triggers the television 100 to execute is to play a next song, and the third task is a subtask of the first task.

It may be understood that if there is no resource conflict between the execution of the first task by the television 100 and the execution of the second task by the television 100, there is no resource conflict between the execution of the third task (namely, a subtask of the first task) by the television 100 and the execution of the second task by the television 100.

In implementation (2), the third task and the first task may be different tasks. For example, the first task may be to play the cartoon "Peppa Pig" shown in (b) in FIG. 5A, and the third task may be to play a somatosensory game, learn English, listen to a children's song, or the like.

The third task and the first task are different tasks. Therefore, there is no resource conflict between the execution of the first task by the television 100 and the execution of the second task by the television 100, which does not mean that there is no resource conflict between the execution of the third task by the television 100 and the execution of the second task by the television 100. In implementation (2), before performing S1003, the television 100 may determine whether there is a resource conflict between the execution of the third task by the television 100 and the execution of the second task by the television 100. If there is no resource conflict between the execution of the third task by the television 100 and the execution of the second task by the television 100, the television 100 may perform S1003. If there is a resource conflict between the execution of the third task by the television 100 and the execution of the second task by the television 100, the television 100 does not perform S1003, but continues to perform S205 to display the interface corresponding to the first task in the first display area, and display the interface corresponding to the second task in the second display area.

S1004: The television 100 displays, in the first display area, the interface corresponding to the first task, and displays, in the second display area, the interface corresponding to the third task.

Figure 12:
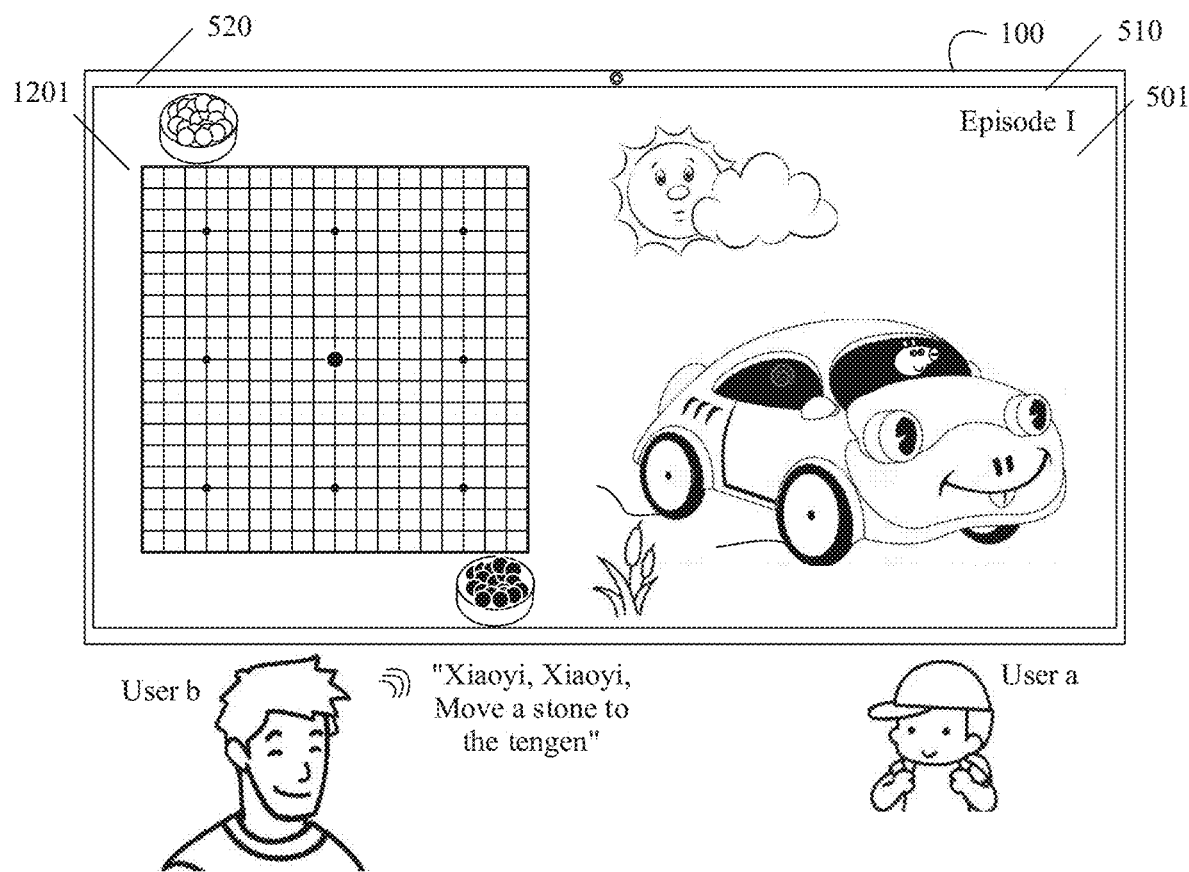
FIG. 12 is a schematic diagram of an example of another display interface of a television according to an embodiment of this application.

With reference to the foregoing example, in a process in which the television 100 plays the cartoon "Peppa Pig" and displays the interface for playing the Go, the television 100 may receive the second voice data sent by the user b (namely, the second user), for example, "xiaoyi, xiaoyi, move a stone to the tengen". The television 100 may perform S1002 to determine that the second voice data is the voice data of the user b. Therefore, in response to the second voice data "xiaoyi, xiaoyi, move a stone to the tengen", as shown in FIG. 12, the television 100 may display an interface after "moving a stone to the tengen" is executed based on the Go in the second display area 520, that is, display the interface 1201 corresponding to the third task. As shown in FIG. 12, the television 100 still displays, in the first display area 510, the interface 501 corresponding to the first task. Certainly, after playing the first episode of "Peppa Pig" in the first display area 510, the television 100 may automatically play the second episode of "Peppa Pig". It should be noted that when the television 100 plays the second episode of "Peppa Pig", a displayed interface is also the interface corresponding to the first task.

In implementation (a), the third task may be a subtask of the second task. For example, when the second task is to play the Go as shown in (b) in FIG. 5A, if the second voice data is "xiaoyi, xiaoyi, move a stone to the tengen", the third task that the second voice data triggers the television 100 to execute is to execute this step of "move a stone to the tengen" based on the Go, and the third task is a subtask of the second task.

It may be understood that if there is no resource conflict between the execution of the first task by the television 100 and the execution of the second task by the television 100, there is no resource conflict between the execution of the third task (namely, a subtask of the second task) by the television 100 and the execution of the first task by the television 100.

In implementation (b), the third task and the second task may be different tasks. For example, the second task may be to play the Go shown in (b) in FIG. 5A, and the third task may be to play a somatosensory game, learn English, listen to a children's song, or the like.

The third task and the second task are different tasks. Therefore, there is no resource conflict between the execution of the first task by the television 100 and the execution of the second task by the television 100, which does not mean that there is no resource conflict between the execution of the third task by the television 100 and the execution of the first task by the television 100. In implementation (b), before performing S1004, the television 100 may determine whether there is a resource conflict between the execution of the third task by the television 100 and the execution of the first task by the television 100. If there is no resource conflict between the execution of the third task by the television 100 and the execution of the first task by the television 100, the television 100 may perform S1004. If there is a resource conflict between the execution of the third task by the television 100 and the execution of the first task by the television 100, the television 100 does not perform S1004, but continues to perform S205 to display the interface corresponding to the first task in the first display area, and display the interface corresponding to the second task in the second display area.

S1005: The television 100 determines whether a total quantity of tasks currently executed by the television 100 is equal to a preset task threshold Specifically, if the total quantity of tasks currently executed by the television 100 is equal to the preset task threshold, the television 100 may perform S1006. If the total quantity of tasks currently executed by the television 100 is less than the preset task threshold, the television 100 may divide the display into three display areas, and separately display the interface corresponding to the first task, the interface corresponding to the second task, and the interface corresponding to the third task in the three display areas.

S1006: The television 100 determines whether a user level of the third user is higher than a user level of the first user or the second user.

It may be understood that if the total quantity of tasks currently executed by the television 100 is equal to the preset task threshold, it indicates that the total quantity of tasks currently executed by the television 100 has reached the upper limit, and the television 100 cannot execute a new task on the premise that the television 100 executes the current task. In this case, the television 100 may determine whether the user level of the third user is higher than the user level of the first user or the second user. In this way, the television 100 can preferentially execute a task triggered by a user with a higher user level. This can improve use experience of the user with the higher user level.

In a scenario, the user level of the first user is different from the user level of the second user. For example, the user level of the first user (for example, the user a) is lower than the user level of the second user (for example, the user b). Alternatively, the user level of the first user (for example, the user a) is higher than the user level of the second user (for example, the user b).

In another scenario, the user level of the first user is the same as the user level of the second user. For example, the user level of the user a is the same as the user level of the user b.

For example, in this embodiment of this application, an example in which the user level of the first user (for example, the user a) is lower than the user level of the second user (for example, the user b) is used to describe the method in this embodiment of this application.

In a first case, after S1006, the television 100 may determine that the user level of the third user is higher than the user level of the first user. If the user level of the third user is higher than the user level of the first user, it indicates that the user level of the first user is the lowest among the first user, the second user, and the third user. In this case, the television 100 may display, in a display area (namely, the first display area) that displays the interface corresponding to the first task triggered by the first user, the interface corresponding to the third task triggered by the third user. In other words, among the first user, the second user, and the third user, the first user has the lowest user level. Therefore, the display area for displaying the interface corresponding to the first task may be occupied by the interface corresponding to the third task. Specifically, after S1006, if the user level of the third user is higher than the user level of the first user, the television 100 may perform S1007.

S1007: The television 100 determines whether there is a resource conflict between the execution of the third task by the television 100 and the execution of the second task by the television 100.

To avoid affecting use experience of the user due to a resource conflict between the execution of the third task by the television 100 and the execution of the second task by the television 100, after S1006, if the user level of the third user is higher than the user level of the first user, the television 100 may determine whether there is a resource conflict between the execution of the third task by the television 100 and the execution of the second task by the television 100.

Specifically, if there is no resource conflict between the execution of the third task by the television 100 and the execution of the second task by the television 100, the television 100 may perform S1008. If there is a resource conflict between the execution of the third task by the television 100 and the execution of the second task by the television 100, the television 100 may continue to perform S1009.

S1008: The television 100 displays, in the first display area, the interface corresponding to the third task, and displays, in the second display area, the interface corresponding to the second task.

Figure 13:
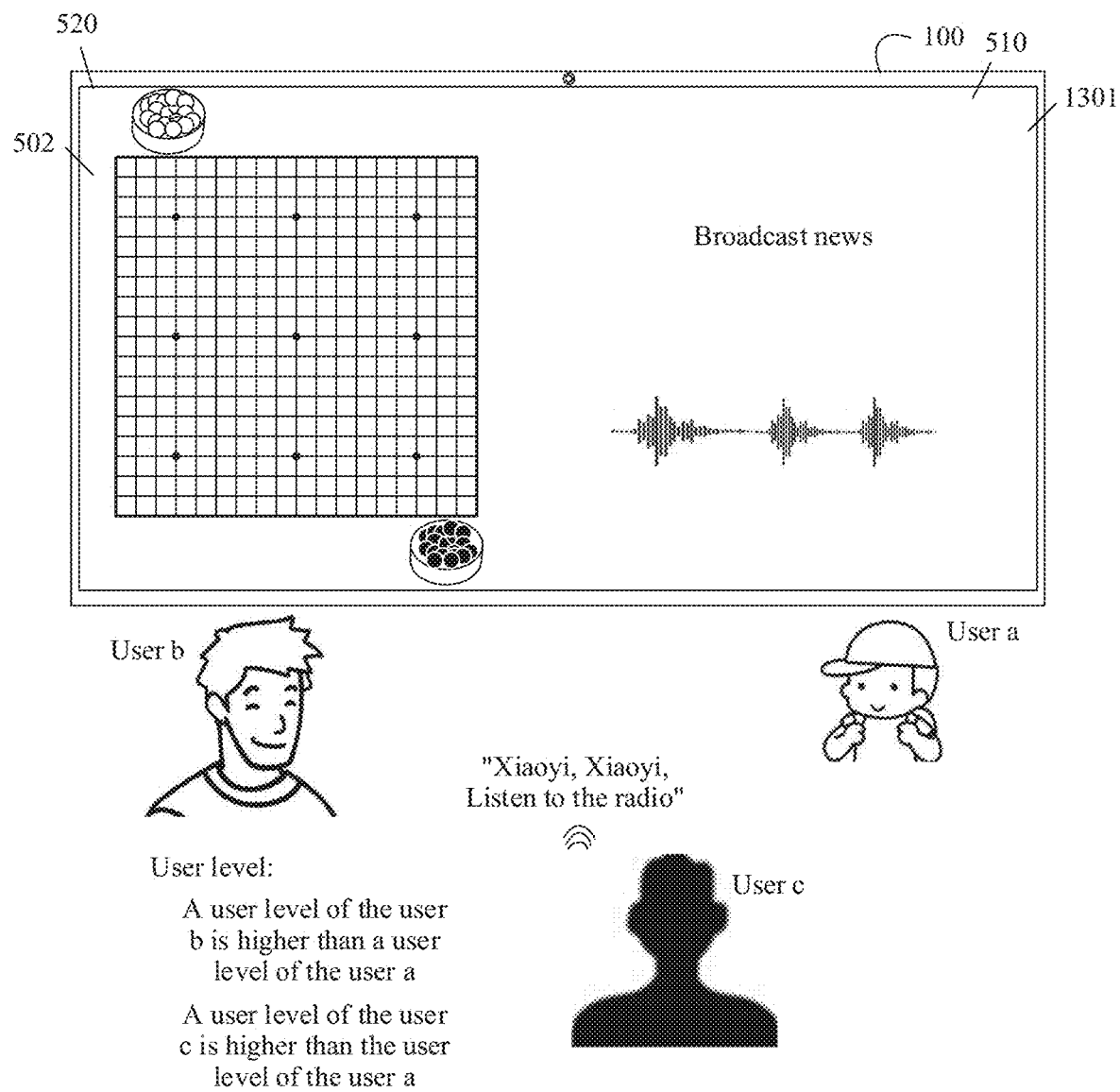
FIG. 13 is a schematic diagram of an example of another display interface of a television according to an embodiment of this application.

With reference to the foregoing example, it is assumed that the preset task threshold is 2, and a user level of a user c (namely, the third user) is higher than the user level of the user a. In a process in which the television 100 plays the cartoon "Peppa Pig" and displays the interface for playing Go, the television 100 may receive second voice data sent by the user c (namely, the third user), for example, "xiaoyi, xiaoyi, listen to the radio". The television 100 may perform S1002 to determine that the second voice data is voice data of the user c. Therefore, in response to the second voice data "xiaoyi, xiaoyi, listen to the radio", the television 100 may perform S1005 to determine that the total quantity (namely, 2) of tasks currently executed by the television 100 is equal to the preset task threshold. The television 100 performs S1006, and may determine that the user level of the user c is higher than the user level of the user a. Because there is no resource conflict between the execution of the second task "play Go" by the television 100 and the execution of the third task "listen to the radio" by the television 100, as shown in FIG. 13, the television 100 may perform S1008 to display, in the first display area 510, the interface 1301 corresponding to the third task "listen to the radio", and still display, in the second display area 520, the interface 502 corresponding to the second task.

S100): The television 100 displays, in the first display area, the interface corresponding to the first task, and displays, in the second display area, the interface corresponding to the second task.

After S1007, if there is a resource conflict between the execution of the third task by the television 100 and the execution of the second task by the television 100, to ensure a program playback effect of the television 100, the television 100 cannot simultaneously execute the second task and the third task. In this case, the television 100 may continue to display, in the first display area, the interface corresponding to the first task, and display, in the second display area, the interface corresponding to the second task. S1009 is the same as S205.

In a second case, after S1006, the television 100 may determine that the user level of the third user is lower than the user level of the first user. If the user level of the third user is lower than the user level of the first user, it indicates that the user level of the third user is the lowest among the first user, the second user, and the third user. In this case, the television 100 may continue to display, in the first display area, the interface corresponding to the first task, and display, in the second display area, the interface corresponding to the second task. Specifically, after S1006, if the user level of the third user is lower than the user level of the first user, the television 100 may perform S1009.

In a third case, after S1006, the television 100 may determine that the user level of the third user is equal to the user level of the first user. If the user level of the third user is equal to the user level of the first user, it indicates that among the first user, the second user, and the third user, the first user and the third user have the lowest user levels.

In an implementation of the third case, the television 100 may perform S1008 to display, in the first display area, the interface corresponding to the third task, and display, in the second display area, the interface corresponding to the second task.

In another implementation of the third case, the television 100 may perform S1009 to display, in the first display area, the interface corresponding to the first task, and display, in the second display area, the interface corresponding to the second task.

In another implementation of the third case, the television 100 may display a second interface, and the second interface is used to prompt the user to confirm that the television 100 executes the first task or the third task. The television 100 displays the second interface, and the user may select the television 100 to perform the first task or the third task. Then, the television 100 may receive a fourth operation or a fifth operation of the user on the second interface. The fourth operation is used to indicate the television 100 to display, on the display, the interface corresponding to the first task. The fifth operation is used to indicate the television 100 to display, on the display, the interface corresponding to the third task. In response to the fourth operation, the television 100 may perform 1009 to display, in the first display area, the interface corresponding to the first task, and display, in the second display area, the interface corresponding to the second task. In response to the fifth operation, the television 100 may perform 1008 to display, in the first display area, the interface corresponding to the third task, and display, in the second display area, the interface corresponding to the second task. For example, the fourth operation may be voice data (namely, a voice command) that is received by the television 100 and that is sent by the user and is used to trigger the television 100 to display the interface corresponding to the first task. The fifth operation may be voice data (namely, a voice command) that is received by the television 100 and that is sent by the user and is used to trigger the television 100 to display the interface corresponding to the third task.

In this embodiment of this application, in a process in which the television 100 displays the interface corresponding to the first task and the interface corresponding to the second task in a split-screen manner, the television 100 may further receive the second voice data (namely, the voice command) that is used to trigger the television 100 to execute a new task (namely, the third task) and display the interface corresponding to the third task. In this case, the television 100 may recognize the user who sends the second voice data, determine whether there is a resource conflict between the execution of the third task by the television 100 and the execution of the first task or the second task by the television 100, and compare the user levels of all the users with each other, to display interfaces of the plurality of tasks in a split-screen manner. According to the method in this embodiment of this application, display content of the electronic device can be enriched, and utilization of the display of the electronic device can be improved. In addition, program playback quality of the plurality of tasks executed by the television 100 can be ensured, and user experience can be improved.

Figure 14:
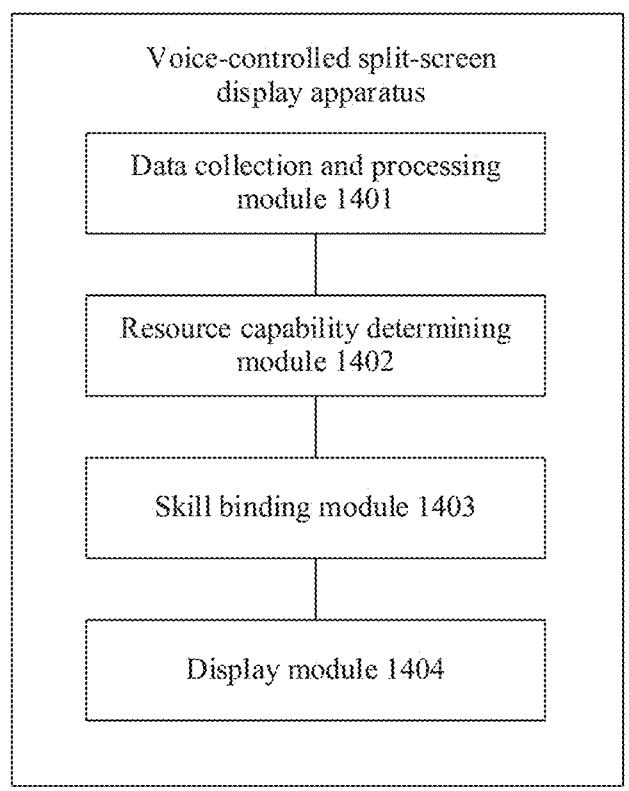
FIG. 14 is a schematic diagram of a composition of a voice-controlled split-screen display apparatus according to an embodiment of this application.

FIG. 14 is a schematic diagram of a voice-controlled split-screen display apparatus according to an embodiment of this application. The voice-controlled split-screen display apparatus may be a function module that is in the foregoing electronic device (for example, the television 100) and that is configured to implement the method in the embodiments of this application. As shown in FIG. 14, the voice-controlled split-screen display apparatus may include: a data collection and processing module 1401, a resource capability determining module 1402, a skill binding module 1403, and a display module 1404.

The data collection and processing module 1401 is configured to support the television 100 in: collecting voice data, recognizing different users by using technologies such as face image recognition, voiceprint information recognition, or lip information recognition, recognizing locations of the users relative to the television 100 (for example, a display of the television 100), recognizing resources required by the voice data to trigger the television 100 to execute a task, and the like. For example, the data collection and processing module 1401 is configured to support the television 100 in performing S202, S203, S801, S802, S1001, and S1002 in the foregoing method embodiments, and/or another process of the technology described in this specification. For example, a function of the data collection and processing module 1401 may be implemented by using the microphone 170C, the camera 193, the processor 110, and the like of the television 100.

The resource capability determining module 1402 is configured to support the television 100 in: determining whether a total quantity of tasks currently executed by the television 100 is equal to a preset task threshold, determining whether there is a resource conflict between execution of a plurality of tasks by the television 100, comparing user levels of the users with each other, and the like. For example, the resource capability determining module 1402 is configured to support the television 100 in performing S601, S1005, S1006, and S1007 in the foregoing method embodiments, and/or another process of the technology described in this specification. For example, a function of the resource capability determining module 1402 may be implemented by using the processor 110 of the television 100.

The skill binding module 1403 is configured to support the television 100 in: binding a correspondence between a user identifier of a user and a task (namely, a skill). For example, the skill binding module 1403 may bind a correspondence between a user identifier of a first user and a first task, and bind a correspondence between a user identifier of a second user and a second task. For example, a function of the skill binding module 1403 may be implemented by using the processor 110 of the television 100.

The display module 1404 is configured to support the television 100 in displaying an interface corresponding to each task. For example, the display module 1404 is configured to support the television 100 in performing S204, S205, the display solution (1) to the display solution (5), S803, S804, S1003, S1004, S1008, and S1009 in the foregoing method embodiments, and/or another process of the technology described in this specification. For example, a function of the display module 1404 may be implemented by using the display 192 of the television 100.

Figure 15A:
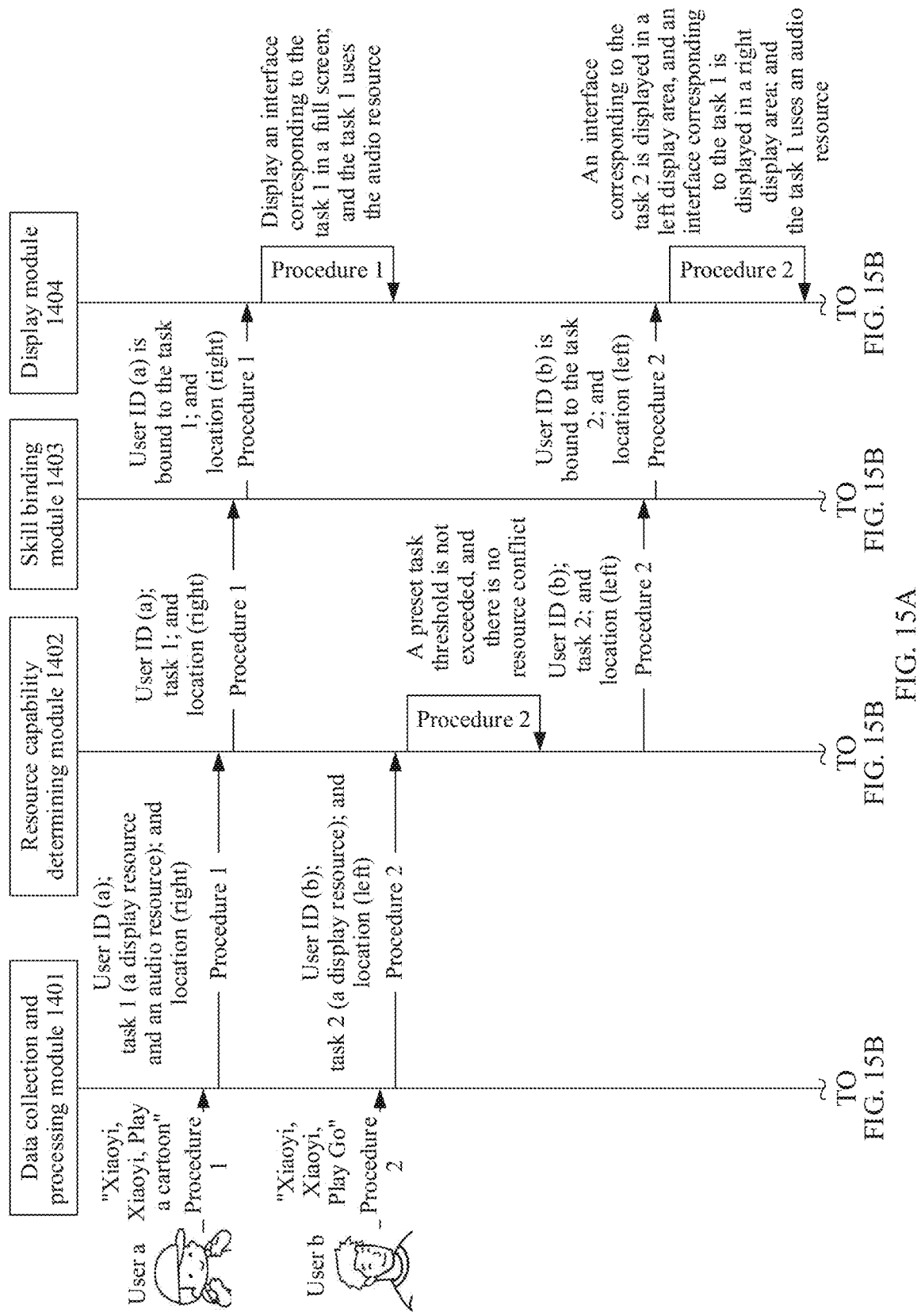
FIG. 15A.
Figure 15C:
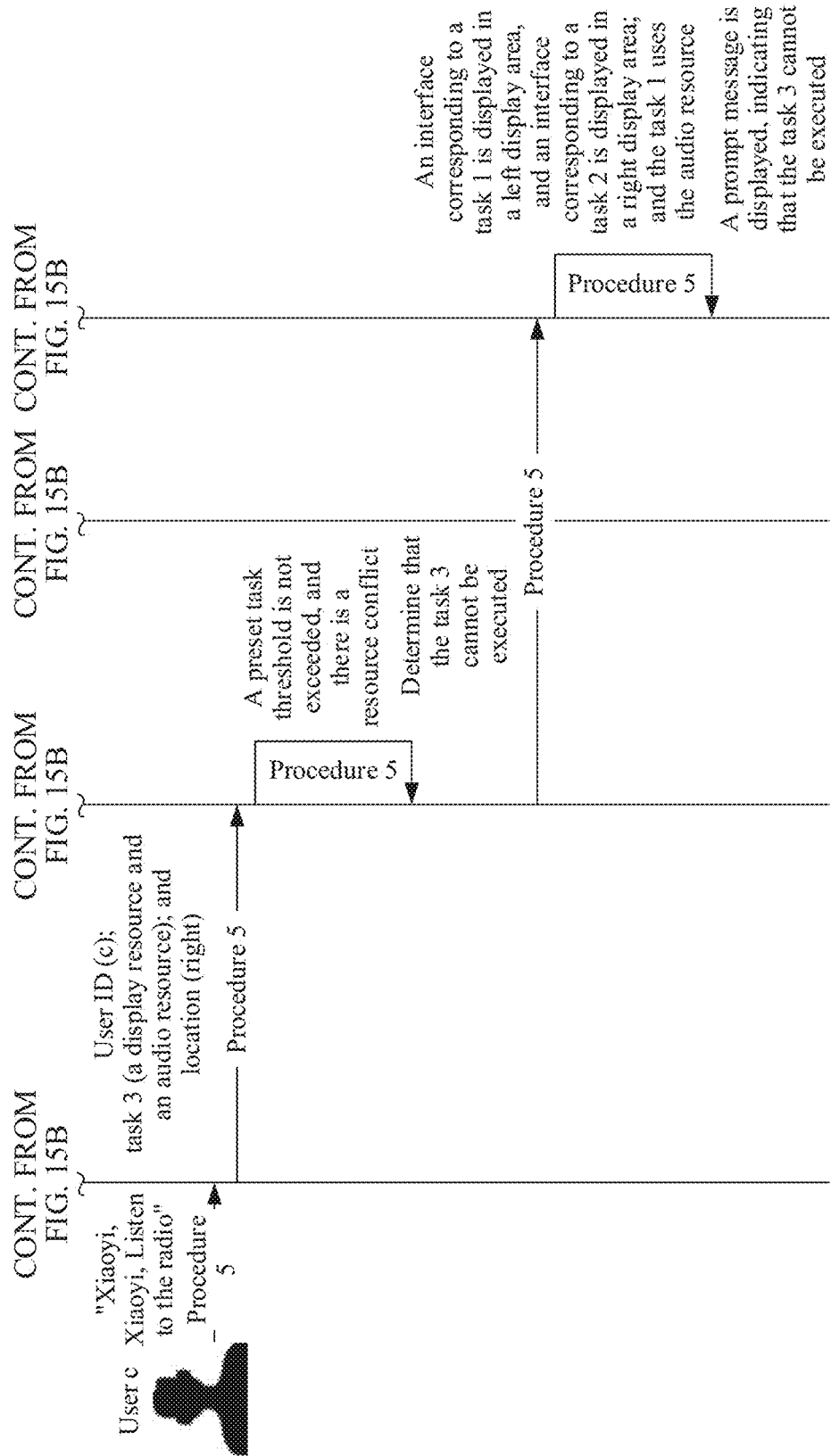

FIG. 15A, FIG. 15B, and FIG. 15C are a flowchart of a principle of a voice-controlled split-screen display method according to an embodiment of this application with reference to FIG. 14.

In a procedure 1 shown in FIG. 15A, FIG. 15B, and FIG. 15C, the data collection and processing module 1401 may receive voice data "xiaoyi, xiaoyi, play a cartoon". The data collection and processing module 1401 may further recognize that the voice data is voice data of a user a (namely, voice data sent by the user a), determine that a user identifier (Identify, ID) of the user a is a, and determine that the voice data "xiaoyi, xiaoyi, play a cartoon" is used to trigger a television 100 to execute a task 1 "play a cartoon", and resources required by the television 100 to execute the task 1 include a display resource and an audio resource. The data collection and processing module 1401 may further determine that the user a is located on the right side of a display 100. Because the task 1 is the only task currently to be executed by the television 100, the resource capability determining module 1402 does not need to determine whether a total quantity of tasks currently executed by the television 100 exceeds a preset task threshold, and does not need to determine whether there is a resource conflict when the television 100 executes a plurality of tasks. The skill binding module 1403 may bind the user ID (a) to the task 1, and record that the user a is located on the right side of the television 100. The display module 1404 may display an interface corresponding to the task 1 in a full screen. In this case, the television 100 executes the task 1 (that is, plays a cartoon) and uses the audio resource of the television 100.

In a procedure 2 shown in FIG. 15A, FIG. 15B, and FIG. 15C, the data collection and processing module 1401 may receive voice data "xiaoyi, xiaoyi, play Go". The data collection and processing module 1401 may further recognize that the voice data is voice data of a user b (namely, voice data sent by the user b), determine that a user ID of the user b is b, and determine that the voice data "xiaoyi, xiaoyi, play Go" is used to trigger a television 100 to execute a task 2 "play Go", and a resource required by the television 100 to execute the task 2 includes a display resource. The data collection and processing module 1401 may further determine that the user b is located on the left side of a display 100. The resource capability determining module 1402 determines that a total quantity of tasks (for example, a task 1) currently executed by the television 100 is 1, and does not exceed a preset task threshold. In addition, there is no resource conflict between the execution of the task 2 by the television 100 and the execution of the task 1 by the television 100. The skill binding module 1403 may bind the user ID (b) to the task 2, and record that the user b is located on the left side of the television 100. The display module 1404 may display, in a left display area, an interface corresponding to the task 2, and display, in a right display area, an interface corresponding to the task 1. In this case, the television 100 executes the task 1 (that is, plays a cartoon) and uses the audio resource of the television 100.

In a procedure 3 shown in FIG. 15A, FIG. 15B, and FIG. 15C, the data collection and processing module 1401 may detect that a user b leaves a television 100 within a first preset time period (for example, the user b leaves a visual range of a camera). The data collection and processing module 1401 may determine, based on a user ID (b) of the user b, to delete a display resource of a task 2 and mark a location of the user b relative to the television as "away". The resource capability determining module 1402 may release the display resource of the task 2. The skill binding module 1403 may temporarily store a progress of the task 2. The display module 1404 may display an interface corresponding to a task 1 in a full screen. In this case, the television 100 executes the task 1 (that is, plays a cartoon) and uses an audio resource of the television 100.

In a procedure 4 shown in FIG. 15A, FIG. 15B, and FIG. 15C, the data collection and processing module 1401 may detect that a user b enters a visual range of a camera within a second preset time period. The data collection and processing module 1401 determines, based on a user ID (b) of the user b, to restore a display resource of a task 2. The data collection and processing module 1401 may further determine that the user b is located on the right side of a display 100. The resource capability determining module 1402 determines that a total quantity of tasks (for example, a task 1) currently executed by the television 100 is 1, and does not exceed a preset task threshold. In addition, there is no resource conflict between the execution of the task 2 by the television 100 and the execution of a task 1 by the television 100. The skill binding module 1403 may extract a progress of the task 2 and record that the user b is located on the right side of the television 100. The display module 1404 may display, in a left display area, an interface corresponding to the task 1, and display, in a right display area, an interface corresponding to the task 2. In this case, the television 100 executes the task 1 (that is, plays a cartoon) and uses an audio resource of the television 100.

In a procedure 5 shown in FIG. 15A, FIG. 15B, and FIG. 15C, the data collection and processing module 1401 may receive voice data "xiaoyi, xiaoyi, listen to the radio". The data collection and processing module 1401 may further recognize that the voice data is voice data of a user c (namely, voice data sent by the user c), determine that a user ID of the user c is c, and determine that the voice data "xiaoyi, xiaoyi, listen to the radio" is used to trigger a television 100 to execute a task 3 "play a broadcast", and resources required by the television 100 to execute a task 2 include a display resource and an audio resource. The data collection and processing module 1401 may further determine that the user b is located on the right side of a display 100. The resource capability determining module 1402 determines that a total quantity of tasks (for example, a task 1 and the task 2) currently executed by the television 100 is 2, and is equal to a preset task threshold. In addition, there is a resource conflict between the execution of the task 3 by the television 100 and the execution of the task 1 by the television 100. Therefore, the resource capability determining module 1402 may determine that the television 100 cannot execute the task 3. The display module 1404 may prompt the user c that the television 100 cannot execute the task 3. In addition, the display module 1404 may display, in a left display area, an interface corresponding to the task 2, and display, in a right display area, an interface corresponding to the task 1. In this case, the television 100 executes the task 1 (that is, plays a cartoon) and uses the audio resource of the television 100.

It should be noted that, if the resource capability determining module 1402 determines that there is a resource conflict between the execution of the task 3 by the television 100 and the execution of the task 1 by the television 100, for the method in which the television 100 displays, based on user levels of the user a, the user b, and the user c, the interfaces corresponding to all the tasks in a split-screen manner, refer to related descriptions in the foregoing embodiments. Details are not described in this embodiment of this application. In addition, if the resource capability determining module 1402 determines that there is no resource conflict between the execution of the task 3 by the television 100 and the execution of the task 1 by the television 100, for the method in which the television 100 displays the interface corresponding to all the tasks in a split-screen manner, refer to related descriptions in the foregoing embodiments. Details are not described in this embodiment of this application.

Some other embodiments of this application provide an electronic device (the television 100 shown in FIG. 1). The electronic device may include a display, a microphone, a memory, and one or more processors. The display, the microphone, and the memory are coupled to the processor. The electronic device may further include a camera. Alternatively, the electronic device may be externally connected to a camera. The memory is configured to store computer program code, where the computer program code includes computer instructions. When the processor executes the computer instructions, the electronic device may perform functions or steps performed by the mobile phone in the foregoing method embodiment. For a structure of the electronic device, refer to the structure of the television 100 shown in FIG. 1.

Figure 16:
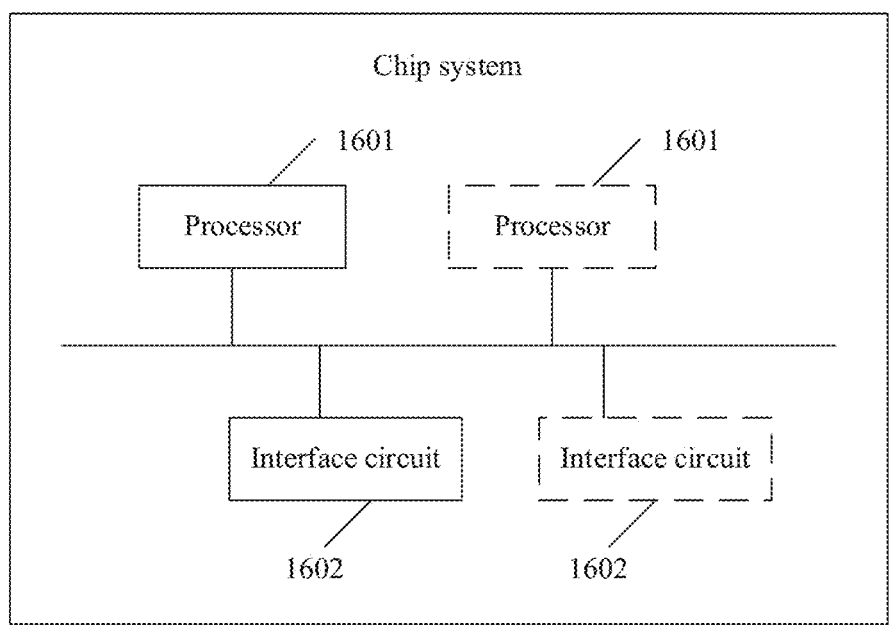
FIG. 16 is a schematic diagram of a structure of a chip system according to an embodiment of this application.

An embodiment of this application further provides a chip system. As shown in FIG. 16, the chip system includes at least one processor 1601 and at least one interface circuit 1602. The processor 1601 and the interface circuit 1602 may be interconnected by using a line. For example, the interface circuit 1602 may be configured to receive a signal from another apparatus (for example, a memory of an electronic device). For another example, the interface circuit 1602 may be configured to send a signal to another apparatus (for example, the processor 1601). For example, the interface circuit 1602 may read instructions stored in a memory, and send the instructions to the processor 1601. When the instructions are executed by the processor 1601, the electronic device (the television 100 shown in FIG. 1) is enabled to perform the steps in the foregoing embodiments. Certainly, the chip system may further include another discrete component. This is not specifically limited in this embodiment of this application.

An embodiment of this application further provides a computer storage medium. The computer storage medium includes computer instructions. When the computer instructions are run on an electronic device (the television 100 shown in FIG. 1), the electronic device is enabled to perform the functions or steps performed by the mobile phone in the foregoing method embodiments.

An embodiment of this application further provides a computer program product. When the computer program product is run on a computer, the computer is enabled to perform the functions or steps performed by the mobile phone in the foregoing method embodiment.

The foregoing descriptions about implementations allow a person skilled in the art to clearly understand that, for the purpose of convenient and brief description, division of the foregoing functional modules is used as an example for illustration. In actual application, the foregoing functions can be allocated to different modules and implemented based on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may be one or more physical units, in other words, may be located in one place, or may be distributed on a plurality of different places. Some or all of the units may be selected based on an actual requirement to achieve an objective of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A voice-controlled split-screen display method, comprising:
   displaying, in response to a first operation of a first user and on a display of an electronic device, a first interface corresponding to a first task while the display does not display an interface corresponding to another task;
   collecting first voice data while displaying the first interface;
   recognizing the first voice data in response to the first voice data comprising a wake-up word of the electronic device, wherein the first voice data is for triggering the electronic device to execute a second task;
   displaying, based on the first voice data being recognized as voice data of a second user, the first interface in a first display area of the display and a second interface corresponding to the second task in a second display area of the display;
   collecting a face image of the first user and a face image of the second user using a camera, wherein the electronic device further comprises the camera or is coupled to the camera;
   displaying, when the electronic device detects the face image of the second user within a first preset time period and does not detect the face image of the first user, the second interface on the display and not displaying the first interface on the display; and
   after the electronic device does not display the first interface, and when the electronic device re-detects the face image of the first user and the face image of the second user within a second preset time period after the first preset time period, either:
      displaying, the first interface in the first display area and the second interface in the second display area; or
      displaying the first interface in the second display area and the second interface in the first display area.

2. The voice-controlled split-screen display method of claim 1, wherein the first display area is proximate to a first side of the display, wherein the second display area is proximate to a second side of the display, wherein the first side and the second side are left and right sides of the display, respectively, and wherein before displaying the first interface in the first display area and the second interface in the second display area, the voice-controlled split-screen display method further comprises determining, using at least one of the camera or a microphone of an electronic device, that the first user is close to the first side of the display and the second user is close to the second side of the display.

3. The voice-controlled split-screen display method of claim 2, further comprising:
   determining, using at least one of the camera or the microphone, that the first user is close to the second side of the display and the second user is close to the first side of the display; and
   displaying the first interface in the second display area and the second interface in the first display area.

4. The voice-controlled split-screen display method of claim 1, wherein displaying the first interface in the first display area and the second interface in the second display area comprises:
   determining, based on the first voice data being recognized as the voice data of the second user, that there is no resource conflict between execution of the second task by the electronic device and execution of the first task by the electronic device; and
   displaying, subsequent to determining that there is no conflict between the execution of the second task by the electronic device and the execution of the first task by the electronic device, the first interface in the first display area and the second interface in the second display area.

5. The voice-controlled split-screen display method of claim 4, further comprising:
   determining, based on the first voice data being recognized as the voice data of the second user, that there is the resource conflict between the execution of the second task by the electronic device and the execution of the first task by the electronic device;
   displaying a third interface; and
   either:
      displaying, in response to a second operation on the third interface, the first interface on the display and not displaying the second interface on the display; or
      displaying, in response to a third operation on the third interface, the second interface on the display and not displaying the first interface on the display.

6. The voice-controlled split-screen display method of claim 1, wherein after the electronic device does not display the first interface and when the electronic device does not detect the face image of the first user within the second preset time period and re-detects the face image of the first user after the second preset time period, the voice-controlled split-screen display method further comprises:
   displaying the second interface on the display; and
   not displaying the first interface on the display.

7. The voice-controlled split-screen display method of claim 1, further comprising:
   collecting second voice data;
   recognizing the second voice data in response to the second voice data comprising the wake-up word, wherein the second voice data is for triggering the electronic device to execute a third task, wherein the third task is different from the first task or is a subtask of the first task; and
   displaying, based on the second voice data being recognized as voice data of the first user, a third interface corresponding to the third task in the first display area and the second interface in the second display area.

8. The voice-controlled split-screen display method of claim 7, wherein the electronic device stores user identifiers of a plurality of users and a user level of each of the plurality of users, wherein a user level of the second user is higher than a user level of the first user, and wherein the voice-controlled split-screen display method further comprises:
   determining, based on the second voice data being recognized as voice data of a third user, whether a user level of the third user is higher than the user level of the first user;
   when the user level of the third user is higher than the user level of the first user:

determining whether there is a resource conflict between execution of the third task by the electronic device and execution of the second task by the electronic device; and displaying, when there is no resource conflict between the execution of the third task by the electronic device and the execution of the second task by the electronic device, the third interface in the first display area and the second interface in the second display area; and displaying, when the user level of the third user is lower than the user level of the first user, the first interface in the first display area and the second interface in the second display area.

9. The voice-controlled split-screen display method of claim 8, further comprising:

when the user level of the third user is equal to the user level of the first user:

displaying, the first interface in the first display area and the second interface in the second display area;

displaying the third interface in the first display area and the second interface in the second display area; or displaying a fourth interface; and regardless of whether the first, third or fourth interface is displayed, either displaying, in response to a fourth operation on the fourth interface, the first interface in the first display area and the second interface in the second display area; or displaying, in response to a fifth operation on the fourth interface, the third interface in the first display area and the second interface in the second display area.

10. An electronic device, comprising:

a display;

a microphone; and one or more processors coupled to the display and the microphone and configured to cause the electronic device to be configured to:

display, in response to a first operation of a first user an on the display, a first interface corresponding to a first task while the display does not display an interface corresponding to another task;

collect first voice data while displaying the first interface;

recognize the first voice data in response to the first voice data comprising a wake-up word of the electronic device, wherein the first voice data is for triggering the electronic device to execute a second task;

display, based on the first voice data being recognized as voice data of a second user, the first interface in a first display area of the display and a second interface corresponding to the second task in a second display area of the display;

collect a face image of the first user and a face image of the second user using a camera, wherein the electronic device further comprises the camera or is coupled to the camera;

display, when the electronic device detects the face image of the second user within a first preset time period and does not detect the face image of the first user, the second interface on the display and not display the first interface on the display; and after not displaying the first interface on the display, and when the electronic device re-detects the face image of the first user and the face image of the second user within a second preset time period after the first preset time period, either:

display the first interface in the first display area and the second interface in the second display area; or display the first interface in the second display area and the second interface in the first display area.

11. The electronic device of claim 10, wherein the first display area is proximate to a first side of the display, wherein the second display area is proximate to a second side of the display, wherein the first side and the second side are left and right sides of the display, respectively, and wherein the one or more processors are further configured to cause the electronic device to be configured to determine, using at least one of the camera or the microphone, that the first user is close to the first side of the display and the second user is close to the second side of the display.

12. The electronic device of claim 11, wherein one or more processors are further configured to cause the electronic device to be configured to:

determine, at least one of using the camera or the microphone, that the first user is close to the second side of the display and the second user is close to the first side of the display; and display the first interface in the second display area and the second interface in the first display area.

13. The electronic device of claim 10, wherein the one or more processors are further configured to cause the electronic device to be configured to:

determine, based on the first voice data being recognized as the voice data of the second user, that there is no resource conflict between execution of the second task by the electronic device and execution of the first task by the electronic device; and display, subsequent to determining that there is not conflict between the execution of the second task by the electronic device and the execution of the first task by the electronic device, the first interface in the first display area and the second interface in the second display area.

14. The electronic device of claim 13, wherein the one or more processors are further configured to cause the electronic device to be configured to:

determine, based on the first voice data being recognized as the voice data of the second user, that there is the resource conflict between the execution of the second task by the electronic device and the execution of the first task by the electronic device;

display a third interface; and either:

display, in response to a second operation on the third interface, the first interface on the display and not displaying the second interface on the display; or display, in response to a third operation on the first interface, the second interface on the display and not displaying the first interface on the display.

15. The electronic device of claim 10, wherein the one or more processors are further configured to cause the electronic device to be configured to after not displaying the first interface, not detecting the face image of the first user within the second preset time period, and re-detecting the face image of the first user after the second preset time period, display the second interface on the display and not display the first interface on the display.

16. The electronic device of claim 10, wherein the one or more processors are further configured to cause the electronic device to be configured to:

collect second voice data;

recognize the second voice data in response to the second voice data comprising the wake-up word, wherein the second voice data is for triggering the electronic device to execute a third task, wherein the third task is different from the first task, or the third task is a subtask of the first task; and display, based on the second voice data being recognized as voice data of the first user, a third interface corresponding to the third task in the first display area and the second interface in the second display area.

17. The electronic device of claim 16, wherein the memory stores user identifiers of a plurality of users and a user level of each of the plurality of users, wherein a user level of the second user is higher than a user level of the first user, and wherein the one or more processors are further configured to cause the electronic device to be configured to:

determine, based on the second voice data being recognized as the voice data of a third user, whether a user level of the third user is higher than the user level of the first user;

when the user level of the third user is higher than the user level of the first user:

determine whether there is a resource conflict between execution of the third task by the electronic device and execution of the second task by the electronic device; and display, when there is no resource conflict between the execution of the third task by the electronic device and the execution of the second task by the electronic device, the third interface in the first display area and display the second interface in the second display area; and display, when the user level of the third user is lower than the user level of the first user, the first interface in the first display area and the second interface in the second display area.

18. The electronic device of claim 17, wherein the one or more processors are further configured to cause the electronic device to be configured to:

when the user level of the third user is equal to the user level of the first user:

display the first interface in the first display area and the second interface in the second display area;

display the third interface in the first display area and the second interface in the second display area; or display a fourth interface; and regardless of whether the first, third or fourth interface is displayed, either display, in response to a fourth operation on the fourth interface, the first interface in the first display area and the second interface in the second display area, or display, in response to a fifth operation on the fourth interface, the third interface in the first display area and the second interface in the second display area.

19. A computer program product comprising computer-executable instructions that are stored on a non-transitory computer-readable storage medium and that, when executed by one or more processors, cause an electronic device to:

display, in response to a first operation of a first user an on a display of the electronic device, a first interface corresponding to a first task while the display does not display an interface corresponding to another task;

collect first voice data while displaying the first interface;

recognize the first voice data in response to the first voice data comprising a wake-up word of the electronic device, wherein the first voice data is for triggering the electronic device to execute a second task;

display, based on the first voice data being recognized as voice data of a second user, the first interface in a first display area of the display and a second interface corresponding to the second task in a second display area of the display;

collect a face image of the first user and a face image of the second user using a camera, wherein the electronic device further comprises the camera or is coupled to the camera;

display, when the electronic device detects the face image of the second user within a first preset time period and does not detect the face image of the first user, the second interface on the display and not display the first interface on the display; and after not displaying the first interface on the display, and when the electronic device re-detects the face image of the first user and the face image of the second user within a second preset time period after the first preset time period, either:

display the first interface in the first display area and the second interface in the second display area; or display the first interface in the second display area and the second interface in the first display area.

20. The computer program product of claim 19, wherein the first display area is proximate to a first side of the display, wherein the second display area is proximate to a second side of the display, wherein the first side and the second side are left and right sides of the display, respectively, and wherein the computer-executable instructions, when executed by the one or more processors, further cause the electronic device to determine, using at least one of the camera or a microphone of the electronic device, that the first user is close to the first side of the display and the second user is close to the second side of the display.

* * * * *